US012618125B2

(12) United States Patent
Kajiura et al.

(10) Patent No.: US 12,618,125 B2
(45) Date of Patent: May 5, 2026

(54) SOFT MAGNETIC ALLOY POWDER, MAGNETIC CORE, MAGNETIC COMPONENT AND ELECTRONIC DEVICE

(71) Applicant: TDK CORPORATION, Tokyo (JP)

(72) Inventors: Yoshiki Kajiura, Tokyo (JP); Akito Hasegawa, Tokyo (JP); Kazuhiro Yoshidome, Tokyo (JP); Hiroyuki Matsumoto, Tokyo (JP); Hironobu Kumaoka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 120 days.

(21) Appl. No.: 17/119,033

(22) Filed: Dec. 11, 2020

(65) Prior Publication Data

US 2021/0230720 A1 Jul. 29, 2021

(30) Foreign Application Priority Data

Dec. 27, 2019 (JP) ................................ 2019-238887
Mar. 23, 2020 (JP) ................................ 2020-051885
Oct. 8, 2020 (JP) ................................ 2020-170481

(51) Int. Cl.
*C22C 19/07* (2006.01)
*B22F 1/065* (2022.01)
(Continued)

(52) U.S. Cl.
CPC .............. *C22C 19/07* (2013.01); *B22F 1/065* (2022.01); *B22F 1/07* (2022.01); *B22F 1/08* (2022.01);
(Continued)

(58) Field of Classification Search
CPC . C22C 19/07; C22C 2200/02; C22C 2200/04; C22C 2200/06; C22C 2202/02;
(Continued)

(56) References Cited

U.S. PATENT DOCUMENTS 6,350,323 B1 2/2002 Inoue et al.
2005/0178476 A1 * 8/2005 Inoue .................. H01F 1/15316
148/304
(Continued)

FOREIGN PATENT DOCUMENTS

CN 101519759 A 9/2009
CN 104694784 A 6/2015
(Continued)

OTHER PUBLICATIONS

Raanaei H., et al. "Synthesis and characterization of nanocrystalline Co—Fe—Nb—Ta—B alloy," Apr. 29, 2017, Journal of Magnetism and Magnetic Materials, vol. 438, pp. 144-151 (Year: 2017).*
(Continued)

*Primary Examiner* — Danielle M. Carda
*Assistant Examiner* — Nazmun Nahar Shams
(74) *Attorney, Agent, or Firm* — Oliff PLC

(57) ABSTRACT

A soft magnetic alloy powder has a specific composition in which a Co content is large. A soft magnetic alloy powder has a glass transition point Tg and a melting point Tm, 900° C.≤Tm≤1200° C. is satisfied, or when coercivity when applying a pressure $X_P$ to a soft magnetic alloy powder is set as $Y_H$, and a straight line obtained by linearly approximating a relationship between $X_P$ and $Y_H$ by a method of least squares is set as $Y_H$=k$X_P$+1, k (unit: Oe/MPa) satisfies 0≤k≤0.00100.

9 Claims, 10 Drawing Sheets

(51) Int. Cl.

| | |
|---|---|
| ***B22F 1/07*** | (2022.01) |
| ***B22F 1/08*** | (2022.01) |
| ***H01F 1/153*** | (2006.01) |
| ***H01F 27/255*** | (2006.01) |

(52) U.S. Cl.
CPC ...... *H01F 1/15333* (2013.01); *B22F 2301/15* (2013.01); *C22C 2200/02* (2013.01); *C22C 2200/04* (2013.01); *C22C 2202/02* (2013.01); *H01F 27/255* (2013.01)

(58) Field of Classification Search
CPC .... H01F 1/15333; H01F 27/255; B22F 1/065; B22F 2301/15
See application file for complete search history.

(56) References Cited

U.S. PATENT DOCUMENTS

| | | | | |
|---|---|---|---|---|
| 2018/0104740 | A1* | 4/2018 | Yamamoto | C22C 19/07 |
| 2018/0135151 | A1* | 5/2018 | Dubach | C22C 45/04 |
| 2019/0221341 | A1 | 7/2019 | Yoshidome et al. | |

FOREIGN PATENT DOCUMENTS

| | | | | |
|---|---|---|---|---|
| CN | 110033916 | A | | 7/2019 |
| JP | 62083401 | A | * | 4/1987 |
| JP | H03-173750 | A | | 7/1991 |
| JP | 2000-204452 | A | | 7/2000 |
| JP | 2007092096 | A | * | 4/2007 |
| JP | 2008-214665 | A | | 9/2008 |
| JP | 2010-212442 | A | | 9/2010 |
| JP | 2011-023673 | A | | 2/2011 |
| JP | 2011-192729 | A | | 9/2011 |
| JP | 2011-231351 | A | | 11/2011 |
| JP | 2016-025352 | A | | 2/2016 |
| JP | 2016-167477 | A | | 9/2016 |

OTHER PUBLICATIONS

Bednarcik, J. et al. "Co-based soft magnetic bulk amorphous ferromagnets prepared by powder consolidation," Physica Status Solidi (a), vol. 199, No. 2, pp. 299-304 (Year: 2003).*
Huaijun Sun [CN104694784A] (machine translation) (Year: 2015).*
Baolong Shen et.al. [CN101519759A] (machine translation) (Year: 2009).*

* cited by examiner

SOFT MAGNETIC ALLOY POWDER, MAGNETIC CORE, MAGNETIC COMPONENT AND ELECTRONIC DEVICE

BACKGROUND OF THE INVENTION

The present invention relates to a soft magnetic alloy powder, a magnetic core, a magnetic component, and an electronic device.

In recent, there has been a demand for low power consumption and high efficiency in electronic/information/communication devices, particularly, in electronic devices. In addition, the demand becomes stronger toward low-carbon society.

Accordingly, in a power supply circuit of the electronic/information/communication devices and the like, particularly, the electronic devices, a reduction in energy loss and an improvement of power efficiency are also required.

Here, for the reduction in energy loss and the improvement of power efficiency, it is required to obtain a soft magnetic alloy powder having excellent soft magnetic characteristics and an improved packing rate when used in a magnetic core.

Patent Document 1 discloses a soft magnetic powder of which Wardell's spheroidicity is improved. In addition, it is also stated that an excellent power inductor can be manufactured by improving the spheroidicity.

Patent Document 2 discloses a Co-based amorphous alloy ribbon. In addition, it is also described that permeability and squareness ratio are improved when the amount of S contained is set to 30 ppm or less, and the amount of Al contained is set to 40 ppm or less.

In addition, as a method of packing the soft magnetic alloy powder in a high density, it is known that methods described in Patent Documents 3 and 4 are effective.

In Patent Document 3, it is described that an inductor having excellent relative permeability can be manufactured by using a soft magnetic alloy powder with high spheroidicity.

In Patent Document 4, it is described that when two kinds of particles having particle sizes different from each other, and a particle size ratio of the two kinds of particles is set within a specific range, particles are filled in a high density, and the relative permeability is improved.

[Patent Document 1] JP 2016-25352 A
[Patent Document 2] JP H3-173750 A
[Patent Document 3] JP 2010-212442 A
[Patent Document 4] JP 2011-192729 A

BRIEF SUMMARY OF INVENTION

An object of the invention is to provide a soft magnetic alloy powder to obtain a magnetic core having satisfactory permeability.

In response to achieve the above object, a soft magnetic alloy powder of a first aspect of the present invention including a main component having a composition formula of $$(Co_{(1-(\alpha+\beta))}X1_{\alpha}X2_{\beta})_{(1-(a+b+c+d+e+f))}M_aB_bP_cSi_dCr_eS_f$$
(atom number ratio), X1 represents one or more selected from the group consisting of Fe and Ni, X2 represents one or more selected from the group consisting of Al, Mn, Ag, Zn, Sn, As, Sb, Cu, Bi, N, O, C, and rare-earth elements, M represents one or more selected from the group consisting of Nb, Hf, Zr, Ta, Mo, W, Ti, and V, $0<a\le 0.140$,
$0.160<b\le 0.250$,
$0\le c\le 0.200$,
$0\le d\le 0.250$,
$0\le e\le 0.030$,
$0\le f\le 0.010$,
$0.160<b+c+d+e+f\le 0.430$,
$0.500<1-(a+b+c+d+e+f)<0.840$,
$\alpha\ge 0$,
$\beta\ge 0$, and
$0\le\alpha+\beta<0.50$ are satisfied, the soft magnetic alloy powder has a glass transition point Tg and a melting point Tm, and 900° C.≤Tm≤1200° C. is satisfied.

According to the soft magnetic alloy powder of the first aspect of the invention, average circularity of powder particles included in the soft magnetic alloy powder may be 0.93 or greater, and a cumulative number ratio from a site where circularity of the powder particles is lowest to a site where the circularity is 0.50 may be 2.0% or less.

According to the soft magnetic alloy powder of the first aspect of the invention, average circularity of powder particles included in the soft magnetic alloy powder may be 0.95 or greater, and a cumulative number ratio from a site where circularity of the powder particles is lowest to a site where the circularity is 0.50 may be 1.5% or less.

According to the soft magnetic alloy powder of the first aspect of the invention, a value obtained by dividing a content ratio of Co by a content ratio of B may be greater than 2.000 and less than 5.000.

According to the soft magnetic alloy powder of the first aspect of the invention, the soft magnetic alloy powder may further include an amorphous material.

According to the soft magnetic alloy powder of the first aspect of the invention, the soft magnetic alloy powder may further include a nanocrystal material.

In response to achieve the above object, a soft magnetic alloy powder of a second aspect of the present invention including a main component having a composition formula of $$(Co_{(1-(\alpha+\beta))}X1_{\alpha}X3_{\beta})_{(1-(a+b+c+d+e))}M_aB_bP_cSi_dCr_e$$
(atom number ratio), X1 represents one or more selected from the group consisting of Fe and Ni, X3 represents one or more selected from the group consisting of Al, Mn, Ag, Zn, Sn, As, Sb, Cu, Bi, N, O, C, S, and rare-earth elements, M represents one or more selected from the group consisting of Nb, Hf, Zr, Ta, Mo, W, Ti, and V, $0<a\le 0.140$,
$0.160<b\le 0.250$,
$0\le c\le 0.200$,
$0\le d\le 0.250$,
$0\le e\le 0.030$,
$0.160<b+c+d+e\ 0.430$,
$0.500<1-(a+b+c+d+e)<0.840$,
$\alpha\ge 0$,
$\beta\ge 0$, and
$0\le\alpha+\beta<0.50$ are satisfied, wherein k (unit: Oe/MPa) satisfies $0\le k\le 0.00100$, in which coercivity when applying a pressure $X_P$ to the soft magnetic alloy powder is set as $Y_H$, and a straight line obtained by linearly approximating a relationship between $X_P$ and $Y_H$ by a method of least squares is set as $Y_H = kX_P + 1$.

According to the soft magnetic alloy powder of the second aspect of the invention, the soft magnetic alloy powder may include a structure composed of an amorphous material.

According to the soft magnetic alloy powder of the second aspect of the invention, the soft magnetic alloy powder may include a structure composed of a hetero-amorphous material.

According to the soft magnetic alloy powder of the second aspect of the invention, the soft magnetic alloy powder may include a structure composed of a nanocrystal material.

The following description is common to the soft magnetic alloy powder according to the first aspect and the soft magnetic alloy powder according to the second aspect.

In the soft magnetic alloy powder according to the invention, an amorphization rate X may be 85% or greater.

A magnetic core according to the invention contains the soft magnetic alloy powder.

A magnetic component according to the invention contains the soft magnetic alloy powder.

An electronic device according to the invention contains the soft magnetic alloy powder.

BRIEF DESCRIPTION OF DRAWINGS

in FIG. 8.

DETAILED DESCRIPTION OF INVENTION

Figure 1:
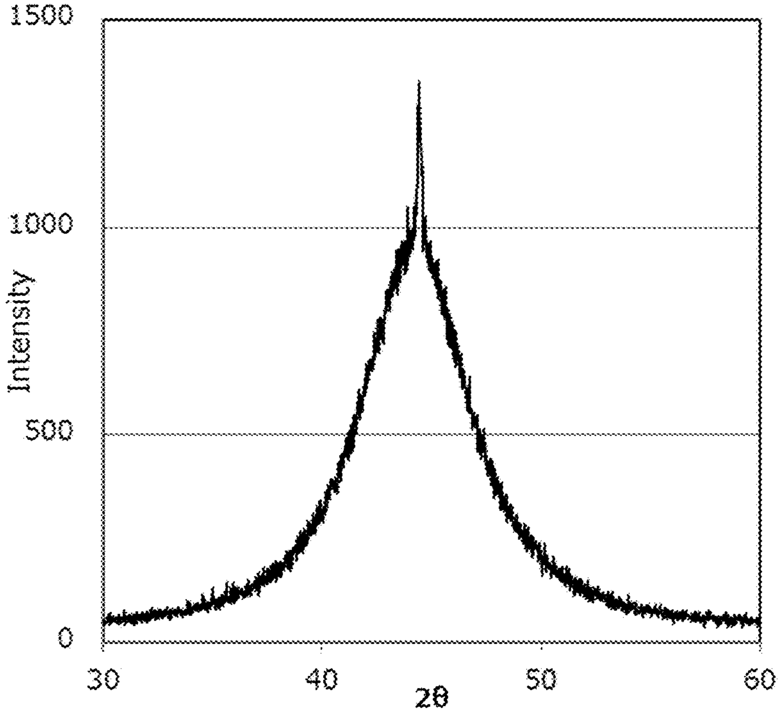
FIG. 1 is a chart obtained by X-ray crystal structure analysis.

Hereinafter, embodiments of the invention will be described.

First Embodiment

A soft magnetic alloy powder of this embodiment is a soft magnetic alloy powder including a main component having a composition formula of $$(Co_{(1-(\alpha+\beta))}X1_{\alpha}X2_{\beta})_{(1-(a+b+c+d+e+f))}M_aB_bP_cSi_dCr_eS_f$$

(atom number ratio), in which

X1 represents one or more selected from the group consisting of Fe and Ni,

X2 represents one or more selected from the group consisting of Al, Mn, Ag, Zn, Sn, As, Sb, Cu, Bi, N, O, C, and rare-earth elements, M represents one or more selected from the group consisting of Nb, Hf, Zr, Ta, Mo, W, Ti, and V, $0<a\leq 0.140$, $0.160<b\leq 0.250$, $0\leq c\leq 0.200$, $0\leq d\leq 0.250$, $0\leq e\leq 0.030$, $0\leq f\leq 0.010$, $0.160<b+c+d+e+f\ 0.430$, $0.500<1-(a+b+c+d+e+f)<0.840$, $\alpha\geq 0$, $\beta\geq 0$, and $0\leq\alpha+\beta<0.50$ are satisfied, the soft magnetic alloy powder has a glass transition point Tg and a melting point Tm and 900° C.≤Tm≤1200° C. is satisfied.

In general, a soft magnetic alloy powder having a composition including a large amount of Co has higher relative permeability in comparison to a soft magnetic alloy powder having a composition including a large amount of Fe. In addition, in the soft magnetic alloy powder having the composition including a large amount of Co, corrosion resistance and electric resistance are likely to be higher, and dielectric loss is likely to be low. In addition, a melting point of the soft magnetic alloy powder having a composition including a large amount of Co is lower than a melting point of the soft magnetic alloy powder having a composition including a large amount of Fe. As a result, in the case of manufacturing the soft magnetic alloy powder by an atomization method such as gas atomization to be described later, an atomization temperature is easy to be lowered. Note that, a melting point of a molten metal composed of a soft magnetic alloy before atomization, and a melting point of a soft magnetic alloy powder obtained by the atomization are typically the same as each other.

The soft magnetic alloy powder according to this embodiment has the above-described composition and has the glass transition point and the melting point, and thus a particle shape of powder particles can be satisfactory. Specifically, since the soft magnetic alloy powder has the above-described composition and has the glass transition point and the melting point, a soft magnetic alloy powder including powder particles with high average spheroidicity can be obtained. In addition, a soft magnetic alloy powder in which the number of powder particles having a particle shape with low circularity is low, that is, a soft magnetic alloy powder in which a ratio of deformed particles is small can be obtained.

In addition, since the soft magnetic alloy powder according to this embodiment includes the powder particles having the above-described particle shape, a packing rate in a magnetic core or the like which uses the soft magnetic alloy powder can be improved, and various characteristics such as relative permeability of the magnetic core or the like can be improved. Hereinafter, the powder particles may be simply referred to as "particles".

In addition, in a case where the soft magnetic alloy powder of this embodiment is subjected to a heat treatment, nanocrystals having a grain size of 100 nm or less or 50 nm or less are likely to precipitate. XRD can be used to confirm existence of a nanocrystal or an amorphous material. In addition, confirmation by using TEM is also possible.

A structure composed of an amorphous material is a structure including only the amorphous material or a structure composed of a hetero amorphous material. The structure composed of the hetero amorphous material is a structure in which initial fine crystals exist in an amorphous material. Note that, an average crystal grain size of the initial fine crystals is not particularly limited, and the average crystal grain size may be 0.3 to 10 nm. In addition, in the structure composed of the amorphous material, an amorphization rate that can be confirmed by XRD is 85% or more. Note that, whether a structure is the structure including only the amorphous material or the structure composed of the hetero amorphous material can be confirmed by TEM. The structure composed of a nanocrystal material is a structure that mainly including nanocrystals. In the structure composed of a crystal material (a nanocrystal material), the amorphization rate that can be confirmed by XRD is less than 85%. In addition, in the structure composed of the nanocrystal material, an average crystal grain size of nanocrystals is 5 to 100 nm. In the structure composed of the hetero amorphous material and the structure composed of the nanocrystal material, a crystal of which a crystal grain size is more than 100 nm is not included. Note that, in this embodiment, it is preferable that the soft magnetic alloy powder has the structure composed of the amorphous material, and more preferably the structure composed of the hetero amorphous material.

In this embodiment, a soft magnetic alloy powder having an amorphization rate X (see the following formula (1)) of 85% or more is considered to have the structure including only the amorphous material or the structure composed of the hetero amorphous material, and a soft magnetic alloy powder having an amorphization rate X of less than 85% is considered to have a structure composed of the crystal material.

$$X=100-(Ic/(Ic+Ia)\times 100) \quad (1)$$

Ic: Scattering integrated intensity of crystal phase

Ia: Scattering integrated intensity of amorphous phase

The amorphization rate X is calculated based on the above-mentioned formula (1) by carrying out an X-ray crystal structure analysis of a soft magnetic alloy powder with XRD, identifying the phase, reading peaks of a crystalized Fe or compound (Ic: scattering integrated intensity of crystal phase, Ia: scattering integrated intensity of amorphous phase), and calculating a crystallization rate from the peak intensities. Hereinafter, the calculation method is more specifically explained.

Figure 2:
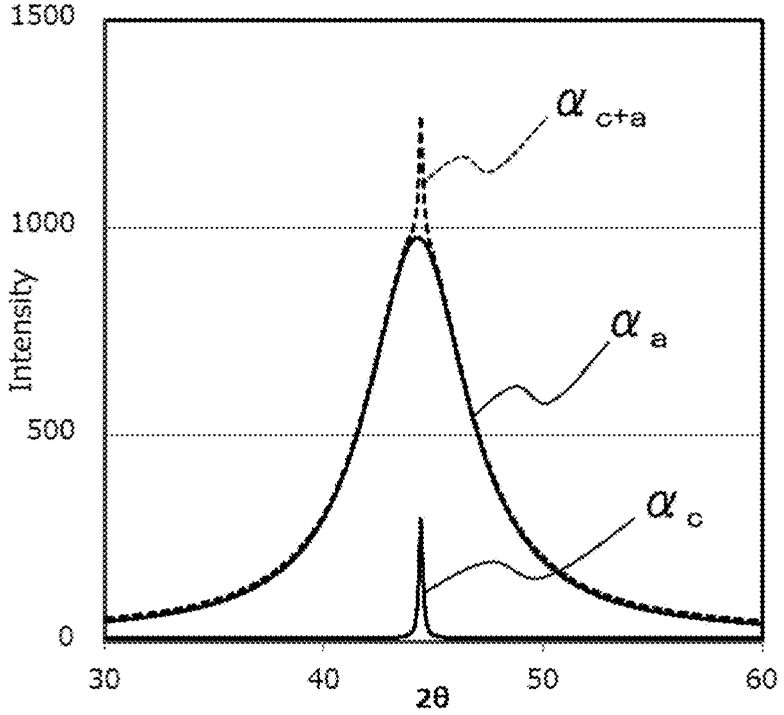
FIG. 2 is a pattern obtained by profile fitting the chart of FIG. 1.

The soft magnetic alloy powder according to the present embodiment is subjected to an X-ray crystal structure analysis by XRD so as to obtain a chart as shown in FIG. 1. This undergoes a profile fitting using the Lorentz function of the following formula (2) so as to obtain a crystal component pattern $\alpha_c$ representing a scattering integrated intensity of crystal phase, an amorphous component pattern $\alpha_a$ representing a scattering integrated intensity of amorphous phase, and a pattern $\alpha_{c+a}$ obtained by combining them as shown in FIG. 2. From the scattering integrated intensity of crystal phase and the scattering integrated intensity of amorphous phase of the obtained patterns, the amorphization rate X is calculated by the above-mentioned formula (1). Incidentally, the measurement range is diffraction angle 2θ=30°-60°, which can confirm a halo derived from amorphousness. In this range, an error between the integral intensity actually measured by XRD and the integral intensity calculated by the Lorentz function is controlled within 1%.

$$f(x)=\frac{h}{1+\frac{(x-u)^2}{w^2}}+b \quad (2)$$

h: peak height u: peak position

W: half-value width b: background height

Note that, in a case where the soft magnetic alloy powder of this embodiment includes nanocrystals, many nanocrystals are included for each particle. That is, a particle size of the soft magnetic alloy powder and a crystal grain size of the nanocrystal described later are different from each other.

Hereinafter, each component of the soft magnetic alloy powder according to this embodiment will be described in detail.

M represents one or more selected from the group consisting of Nb, Hf, Zr, Ta, Mo, W, Ti, and V.

The M content (a) satisfies $0<a\leq 0.140$. $0.001\leq a\leq 0.140$ may be satisfied. In addition, $0.003\leq a\leq 0.140$ may be satisfied or $0.040\leq a\leq 0.100$ may be satisfied. In a case where M is not contained, the soft magnetic alloy powder is less likely to have the glass transition point Tg. As a result, circularity of particles is likely to decrease, and relative permeability decreases. In a case where the M content (a) is excessively large, the melting point Tm of the soft magnetic alloy powder is likely to decrease. As a result, the circularity of particles is likely to decrease, a ratio of deformed particles in the soft magnetic alloy powder increases, and the relative permeability decreases. In addition, a saturation magnetic flux density is likely to decrease. Note that, $0.010\leq a\leq 0.140$ is preferable from the viewpoint of easily decreasing coercivity.

The B content (b) satisfies $0.160<b\leq 0.250$. $0.180\leq b\leq 0.250$ may be satisfied. In a case where the B content (b) is excessively small, the melting point Tm of a soft magnetic alloy becomes excessively high, and thus it may be difficult to inject a molten metal, and it may be difficult to manufacture the soft magnetic alloy powder. In a case where the B content (b) is excessively large, the melting point Tm becomes excessively low, the ratio of the deformed particles in the soft magnetic alloy powder increases, the coercivity increases, and the relative permeability decreases.

The P content (c) satisfies $0\leq c\leq 0.200$. That is, P may not be contained. More preferably, $0\leq c\leq 0.150$ is satisfied, and still more preferably, $0.010\leq c\leq 0.050$ is satisfied. In a case where the P content (c) is excessively large, the melting point Tm of the soft magnetic alloy powder becomes excessively low, the ratio of the deformed particles in the soft magnetic alloy powder increases, the coercivity increases, and the relative permeability decreases.

The Si content (d) satisfies $0\leq d\leq 0.250$. That is, Si may not be contained. More preferably, $0\leq d\leq 0.200$ is satisfied. In a case where the Si content (d) is excessively large, the melting point Tm of the soft magnetic alloy powder becomes excessively low, the circularity decreases, the ratio of the deformed particles in the soft magnetic alloy powder increases, the coercivity increases, and the relative permeability decreases.

The Cr content (e) satisfies $0\leq e\leq 0.030$. That is, Cr may not be contained. More preferably, $0.001\leq e\leq 0.010$ is satisfied. When Cr is contained, corrosion resistance of the soft magnetic alloy powder is likely to increase. In a case where the Cr content (e) is excessively large, the ratio of the deformed particles in the soft magnetic alloy powder increases, the coercivity increases, and the relative permeability decreases.

The S content (f) satisfies $0 \leq f \leq 0.010$. That is, S may not be contained. As the S content (f) increases, the ratio of the deformed particles in the soft magnetic alloy powder decreases. However, when the S content (f) is excessively large, the coercivity increases, and the relative permeability decreases.

In addition, the soft magnetic alloy powder according to this embodiment satisfies $0.160 < b+c+d+e+f \leq 0.430$. 0.190 $b+c+d+e+f \leq 0.430$ may be satisfied. In a case where b+c+d+e+f is excessively large, it is difficult to obtain a soft magnetic alloy powder with high relative permeability.

In addition, the soft magnetic alloy powder according to this embodiment satisfies $0.500 < 1-(a+b+c+d+e+f) < 0.840$. $0.550 \leq 1-(a+b+c+d+e+f) \leq 0.800$ may be satisfied. Even in a case where 1−(a+b+c+d+e+f) is excessively small or excessively large, it is difficult to obtain a soft magnetic alloy powder with high relative permeability.

In addition, in the soft magnetic alloy powder of this embodiment, a part of Co may be substituted with X1 and/or X2.

X1 represents one or more selected from the group consisting of Fe and Ni. With regard to the X1 content (a), a may be zero. That is, X1 may not be contained. In addition, when the number of atoms of the entirety of the composition is set as 100 at %, the number of atoms of X1 is preferably 40 at % or less. That is, it is preferable to satisfy $0 \leq \alpha\{1-(a+b+c+d+e+f)\}0.400$. In addition, it is more preferable to satisfy $0 \leq \alpha\{1-(a+b+c+d+e+f)\}0.100$. In addition, in a case where Fe is slightly contained, the coercivity is more likely to decrease and the relative permeability is more likely to be high in comparison to a case where Fe is not contained at all. Particularly, in a case where Co/Fe is 5 to 20 in the atom number ratio, the coercivity is likely to decrease and the relatively permeability is likely to be high.

X2 represents one or more selected from the group consisting of Al, Mn, Ag, Zn, Sn, As, Sb, Cu, Bi, N, O, C, and rare earth elements. With regard to the X2 content (β), β may be zero. That is, X2 may not be contained. In addition, when the number of atoms of the entirety of the composition is set as 100 at %, the number of atoms of X2 is preferably 5.0 at % or less. That is, it is preferable to satisfy $0 \leq 0\{1-(a+b+c+d+e+f+g)\} \leq 0.050$.

An amount of substitution of Co by X1 and/or X2 is less than the half of Co on the basis of the number of atoms. That is, $0 \leq \alpha+\beta < 0.50$ is set. $0 \leq \alpha+\beta \leq 0.40$ is also possible. In a case where α+β is excessively large, particularly, in the case of $\alpha+\beta \geq 0.50$, the melting point of the soft magnetic alloy becomes excessively high, and thus it may be difficult to inject a molten metal, and it may be difficult to manufacture the soft magnetic alloy powder.

Note that, even in a case where the melting point of the soft magnetic alloy is high, the molten metal can be injected by raising an atomization temperature. However, in a case where the atomization temperature is high, the circularity of the soft magnetic alloy powder is likely to decrease, the ratio of the deformed particles in the soft magnetic alloy powder is likely to increase, the coercivity is likely to increase, and the relative permeability is likely to decrease.

A value obtained by dividing a content ratio of Co by a content ratio of B (hereinafter, may be referred to as Co/B) may be more than 2.000 and less than 5.250, may be more than 2.000 and less than 5.000, or may be 2.340 or more to 4.000 or less. When Co/B is within the above-described ranges, the melting point Tm of the soft magnetic alloy powder described later is likely to be lowered, and the atomization temperature is likely to be lowered.

Note that, the soft magnetic alloy powder of this embodiment may contain inevitable impurities other than the elements contained as the main component in a range that does not significantly affect characteristics such as the relative permeability. For example, the inevitable impurities may be contained in an amount of 0.1 mass % or less with respect to 100 mass % of soft magnetic alloy powder.

Hereinafter, a method of evaluating a particle shape and a particle size in the soft magnetic alloy powder of this embodiment will be described.

Evaluation on the spheroidicity of the soft magnetic alloy powder may be performed by evaluating circularity of a figure obtained by projecting a particle shape of the soft magnetic alloy powder.

Figure 3:
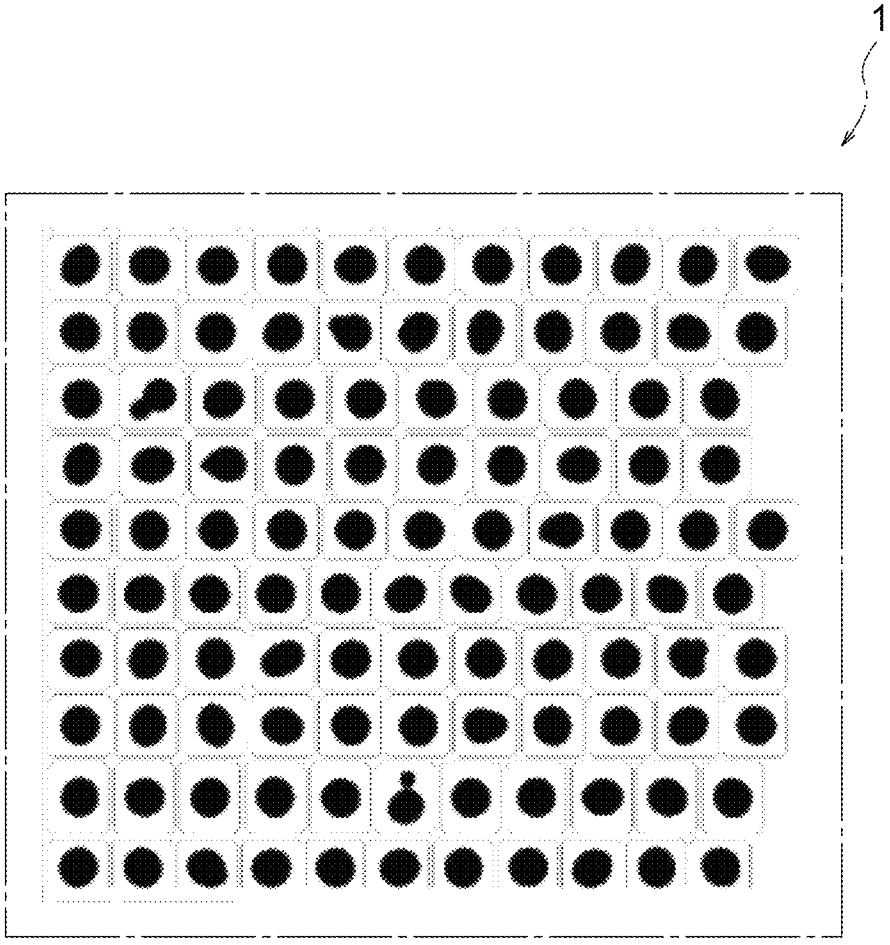
FIG. 3 is an observation result of powder particles with high circularity by Morphologi G3.
Figure 4:
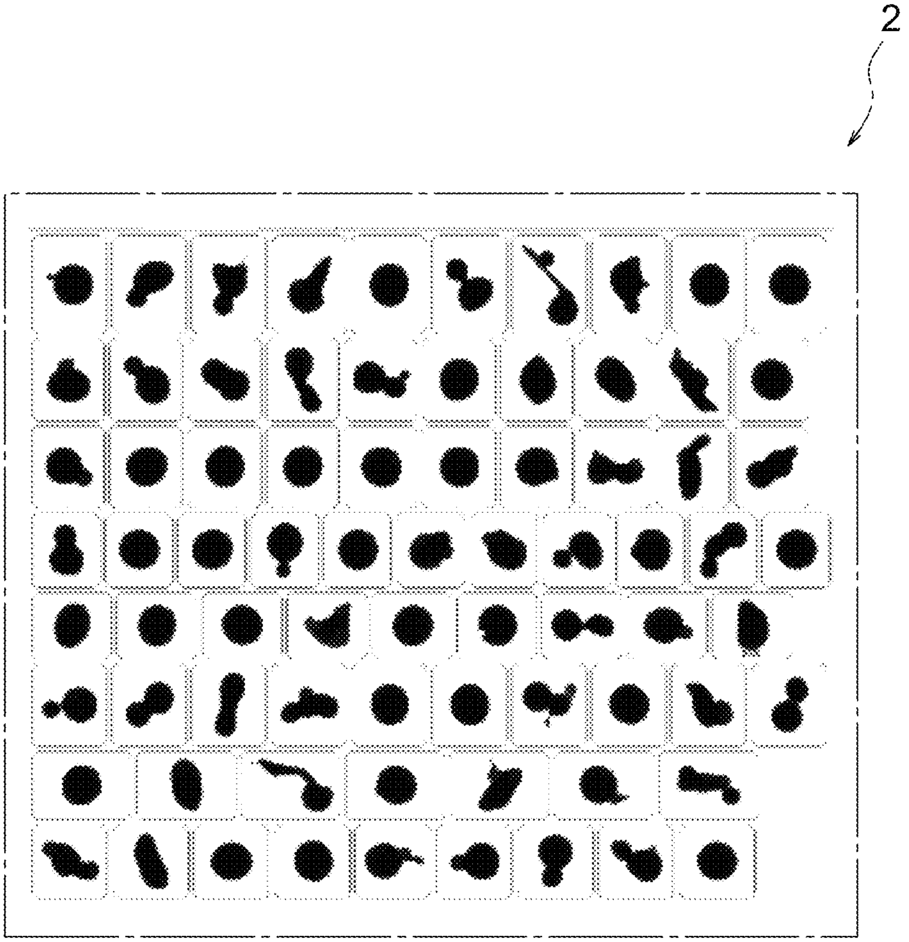
FIG. 4 is an observation result of powder particles with low circularity by Morphologi G3.

In this embodiment, the particle shape is evaluated by using Morphologi G3 (manufactured by Malvern Panalytical Ltd.). Morphologi G3 is a device that can evaluate the particle shape by dispersing powders by air and projecting an individual particle shape. The particle shape in which a particle size is approximately 0.5 μm to several mm can be evaluated with an optical microscope or a laser microscope. Specifically, as can be seen from particle shape measurement results 1 and 2 shown in FIG. 3 and FIG. 4, evaluation can be made by projecting many particle shapes at a time. However, actually, evaluation can be made by projecting particle shapes greater in comparison to the particle shape measurement results 1 and 2 shown in FIG. 3 and FIG. 4 at a time. Note that, FIG. 3 illustrates a projection result of powder particles in which particle shapes are satisfactory and the circularity is high, and FIG. 4 illustrates a projection result of powder particles in which particle shapes are not satisfactory and the circularity is low.

Morphologi G3 can make an evaluation by preparing projection diagrams of many particles at a time. Therefore, when using the evaluation method using Morphologi G3, the shapes of a large number of particles can be evaluated in a shorter time than when using the conventional evaluation method using SEM observation. For example, in the following example, projection diagrams are prepared with respect to 20,000 particles, the circularity of an individual particle is automatically calculated, and average circularity is calculated on the number basis. In contrast, in the SEM observation in the related art, since the circularity is calculated for each particle by using a SEM image, it is difficult to evaluate the shapes of many particles in a short time.

When an area of each particle in the projection diagrams is set as S, and a length of the periphery of each particle in the projection diagrams is set as L, the circularity of each particle is expressed by $2(\pi S)^{1/2}/L$. The circularity of a circle is 1, and the further the circularity of the particle closes to 1, the higher the spheroidicity of the particle becomes.

The soft magnetic alloy powder according to this embodiment has the above-described composition, and thus the average circularity can be made to be high. Specifically, the average circularity can be set to 0.93 or more. The average circularity is preferably 0.95 or more.

The ratio of the deformed particles is evaluated by the following method.

A cumulative number ratio (cumulative frequency) on a side where the circularity is lowest is calculated with respect to 20,000 particles for which the circularity is measured. In addition, it is assumed that the smaller the cumulative number ratio from the side where the circularity is lowest to a side where the circularity is 0.50 is, the smaller the ratio of the deformed particles is.

The soft magnetic alloy powder according to this embodiment has the above-described composition, and thus the melting point Tm can be set within a range of 900° C.≤Tm≤1200° C., and the ratio of the deformed particles can be set to be small. In addition, specifically, the cumulative number ratio from a side where the circularity is lowest to a side where the circularity is 0.50 can be set to 2.5% or less, or 2.0% or less. Preferably, the cumulative number ration from a side where the circularity is lowest to a side where the circularity is 0.50 is 1.5% or less. Note that, there is no particular limitation to the lower limit of the cumulative number ratio from a side where the circularity is lowest to a side where the circularity is 0.50. For example, the lower limit may be 0.05% or more.

Figure 5:
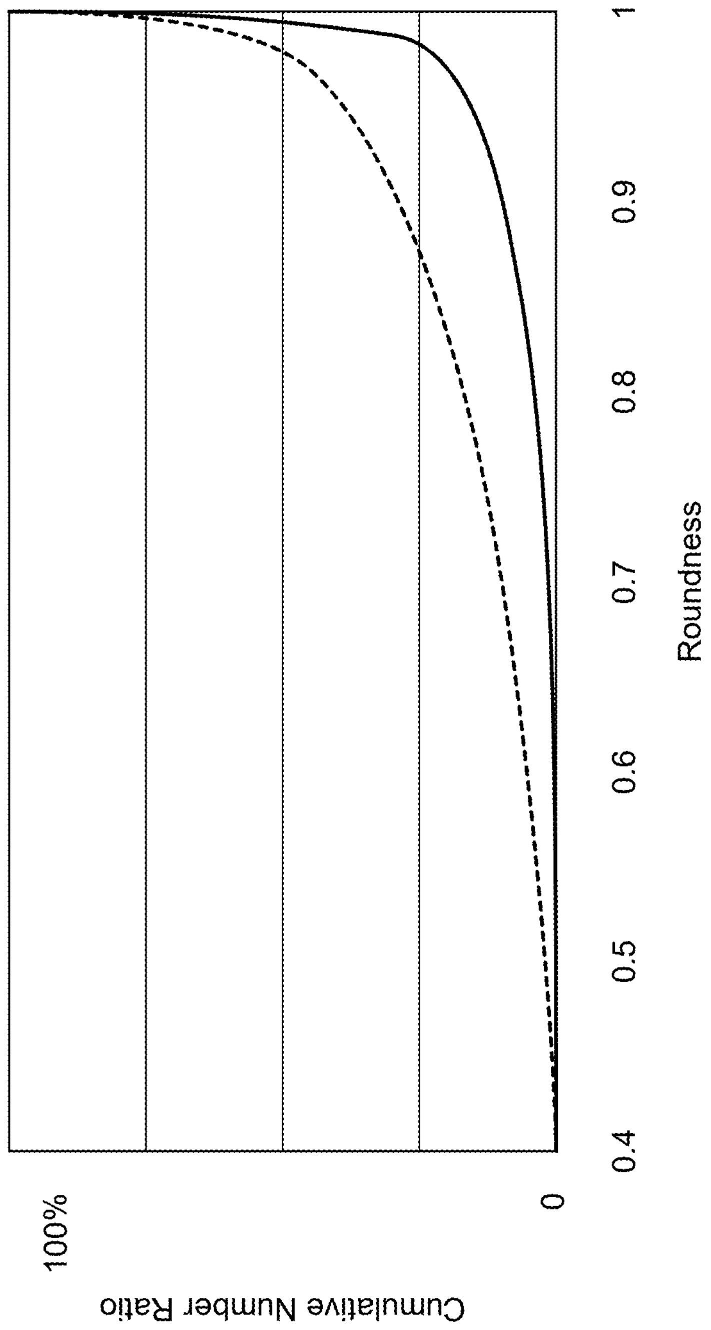
FIG. 5 is a graph showing a relationship between circularity and a cumulative number ratio.
Figure 6:
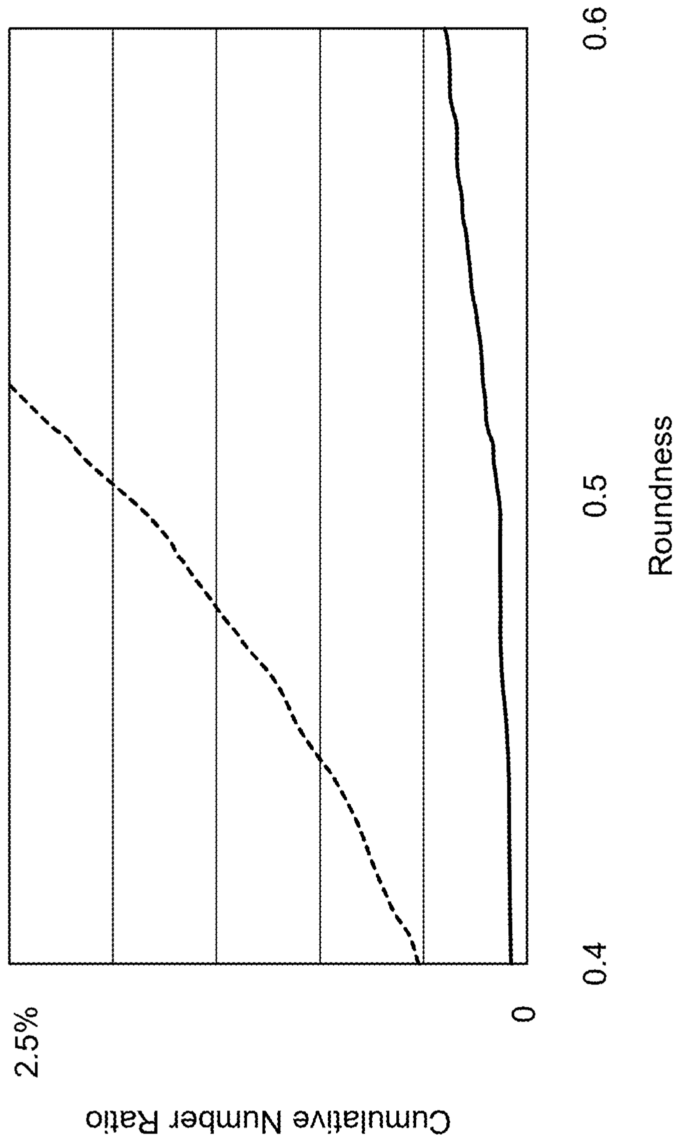
FIG. 6 is a graph showing a portion where the circularity is 0.4 to 0.6 in FIG. 5.

An example of a graph in which the horizontal axis represents the circularity and the vertical axis represents the cumulative number ratio is shown in FIG. 5 and FIG. 6. In the case of a solid line, the cumulative number ratio from a side where the circularity is lowest to a side where the circularity is 0.50 is 1.5% or less. In contrast, in the case of a dotted line, the cumulative number ratio from a side where the circularity is lowest to a side where the circularity is 0.50 is more than 1.5% to 2.0% or less. That is, in the case of the solid line, it can be evaluated that a ratio of deformed particles is smaller in comparison to the case of the dotted line.

A method of evaluating a particle size is described below.

In this embodiment and an example described later, the particle size is evaluated on the volume basis. There is no particular limitation to a method of measuring an average particle size (D50) on the volume basis. For example, the average particle size (D50) on the volume basis can be obtained by using a laser diffraction type particle size distribution measuring device.

In this embodiment, there is no particular limitation to an average particle size of the soft magnetic powder. For example, the average particle size may be 5 to 50 μm.

Hereinafter, the glass transition point Tg, the melting point Tm, and the like will be described with reference to the accompanying drawings.

Figure 7:
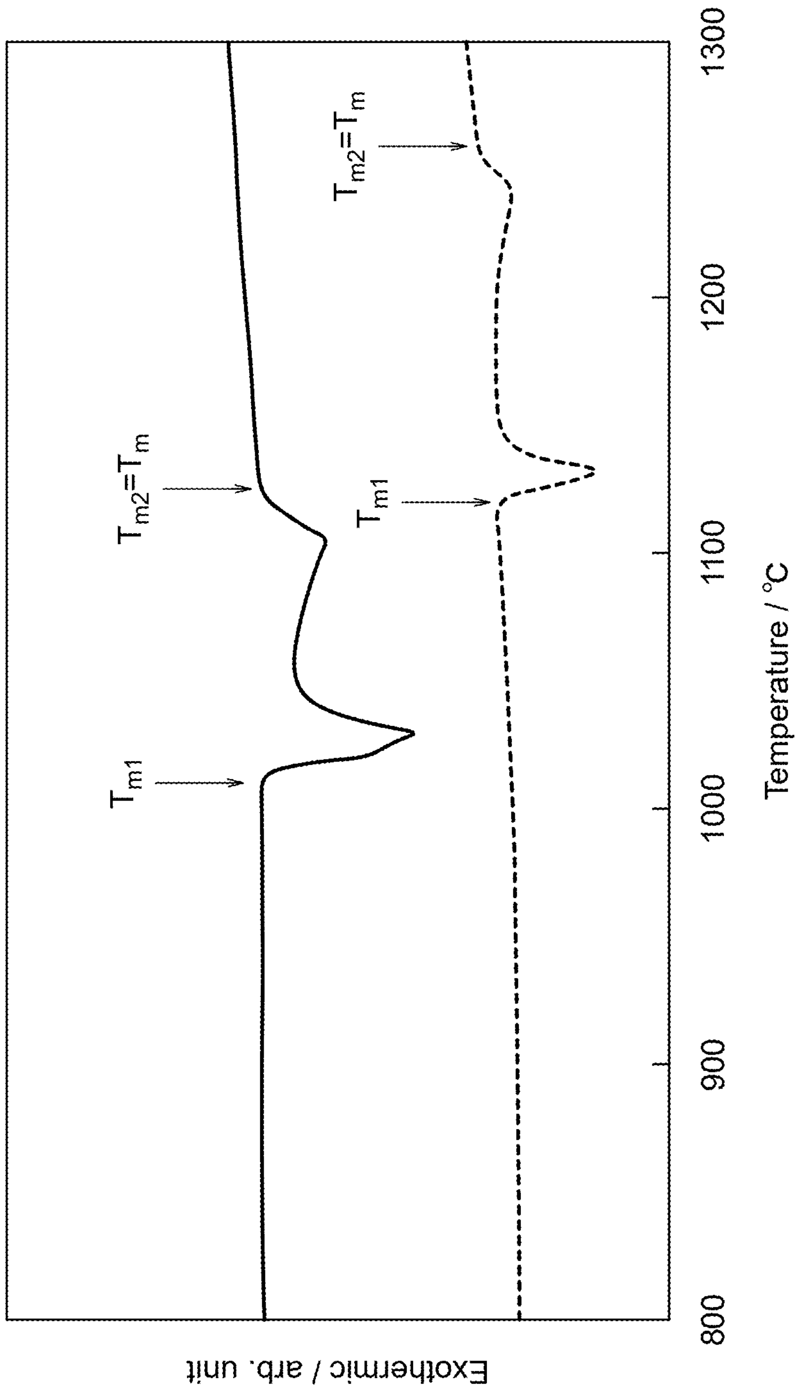
FIG. 7 is a graph showing a melting point Tm.

In FIG. 7, a solid line represents an example of a thermophysical property measurement result by differential scanning calorimetry (DSC) in the soft magnetic alloy powder (hereinafter, simply referred to as "DSC measurement result") of this embodiment, and a dotted line represents an example of a DSC measurement result in an Fe-based soft magnetic alloy powder composed of the amorphous material. A temperature rising rate is constant. Typically, a temperature at which melting of the soft magnetic alloy initiates (Tm1 in FIG. 7) may be set as a melting point, and a temperature at which melting of the soft magnetic alloy is completed (Tm2 in FIG. 7) may be set as the melting point. In this specification, the temperature at which melting is completed (Tm2 in FIG. 7) is set as the melting point Tm. The reason for this is as follows. The temperature at which melting is completed has a greater influence on a temperature an atomization temperature and a molten metal temperature when performing an atomization method such as gas atomization described later, and has a greater influence on characteristics of a soft magnetic alloy powder obtained by the atomization method than the temperature at which melting initiates.

In addition, when raising a temperature of the soft magnetic alloy powder of this embodiment which contains an amorphous material, a glass transition reaction (endothermic reaction) occurs at a specific temperature. This temperature is the glass transition point Tg. In addition, when reaching a high temperature, a crystallization reaction (exothermic reaction) occurs at a certain temperature. This temperature is a crystallization initiation point Tx. In this case, a supercooled liquid region ΔT is expressed by Tx−Tg.

The supercooled liquid region relates to stabilization of an amorphous material. As the supercooled liquid region is wider and ΔT is greater, amorphous material formability is high. In contrast, as the supercooled liquid region is narrow, the amorphous material formability is low. ΔT is preferably 20° C. or higher.

Figure 8:
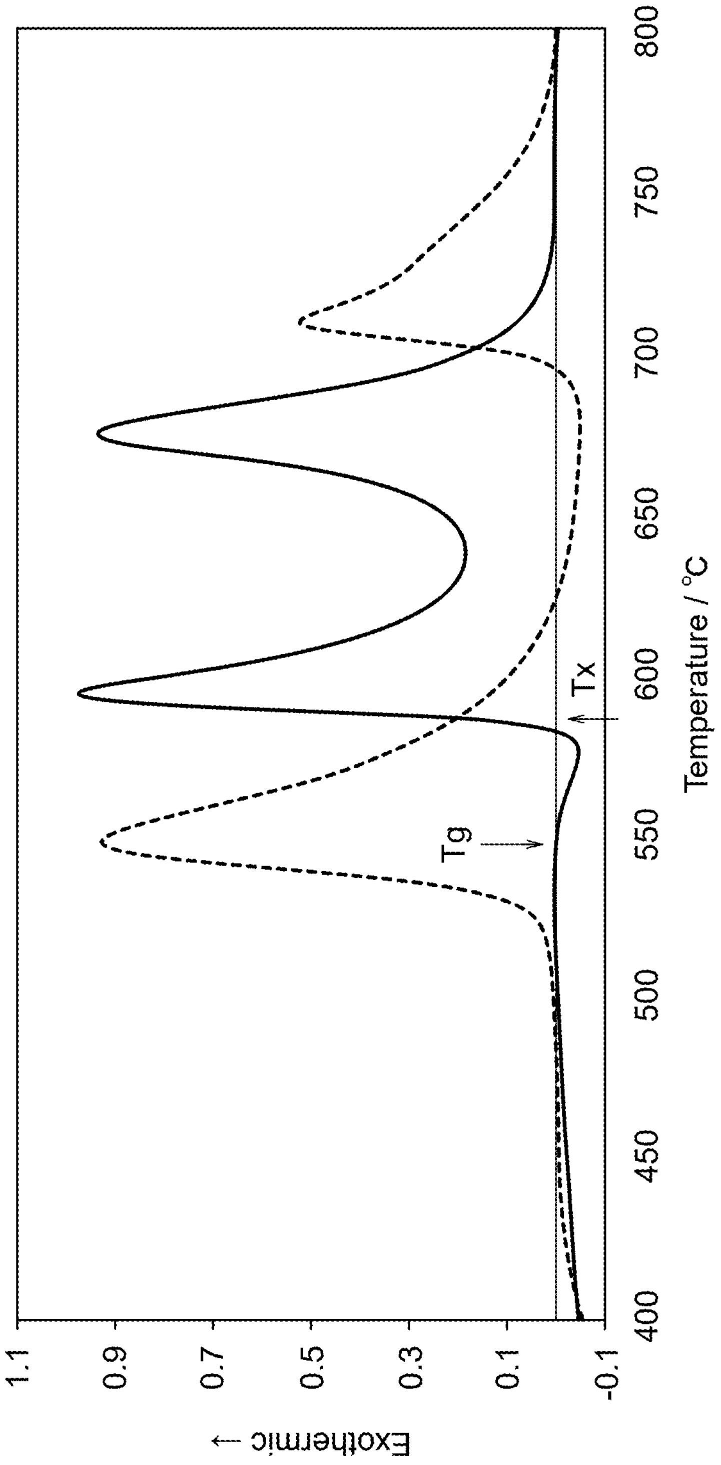
FIG. 8 is a graph showing a glass transition point Tg and a crystallization initiation point Tx.
Figure 9:
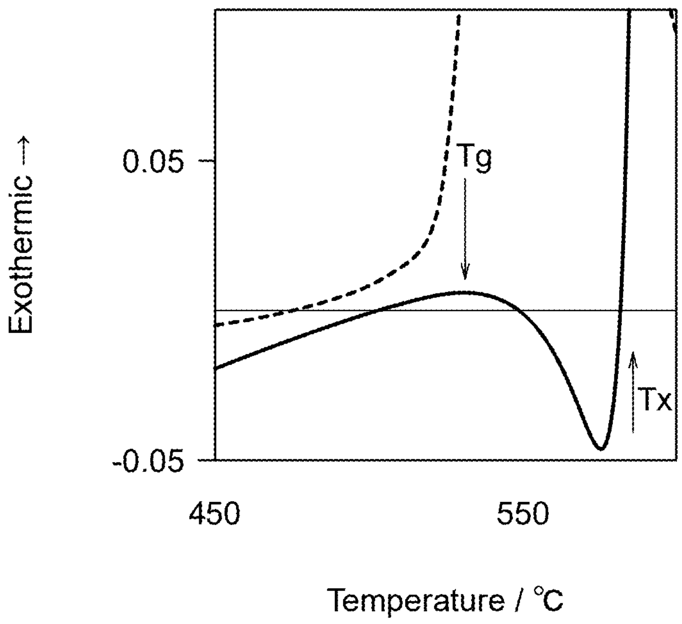
FIG. 9 is a graph showing a portion where a temperature is 450° C. to 600° C.

In FIG. 8 and FIG. 9, a solid line represents an example of the thermophysical property measurement result by the DSC in the soft magnetic alloy powder of this embodiment, and a dotted line represents an example of the DSC measurement result in the Fe-based soft magnetic alloy powder composed of the amorphous material. A temperature rising rate is constant. The soft magnetic alloy powder of this embodiment has the glass transition point Tg and the crystallization initiation point Tx.

In contrast, the Fe-based soft magnetic alloy powder composed of the amorphous material does not have the glass transition point Tg. Note that, a crystallization initiation point of the Fe-based soft magnetic alloy powder composed of the amorphous material is not shown in the drawings.

The soft magnetic alloy powder of this embodiment has characteristics in that Tm is lower in comparison to the Fe-based soft magnetic alloy powder composed of the amorphous material, and Tg exists. According to this, the atomization temperature can be lowered. In addition, the coercivity of the soft magnetic alloy powder decreases, the relative permeability of the soft magnetic alloy powder is improved, the average circularity of the soft magnetic alloy powder increases, and the ratio of the deformed particles in the soft magnetic alloy powder can be lowered. In addition, the packing rate of the magnetic core using the soft magnetic alloy powder is improved, and the relative permeability can be improved.

Hereinafter, a method of manufacturing the soft magnetic alloy powder of this embodiment will be described.

Examples of the method of manufacturing the soft magnetic alloy powder of this embodiment include the gas atomization method.

Hereinafter, description will be given of the method of manufacturing the soft magnetic alloy powder by the gas atomization method.

Figure 10A:
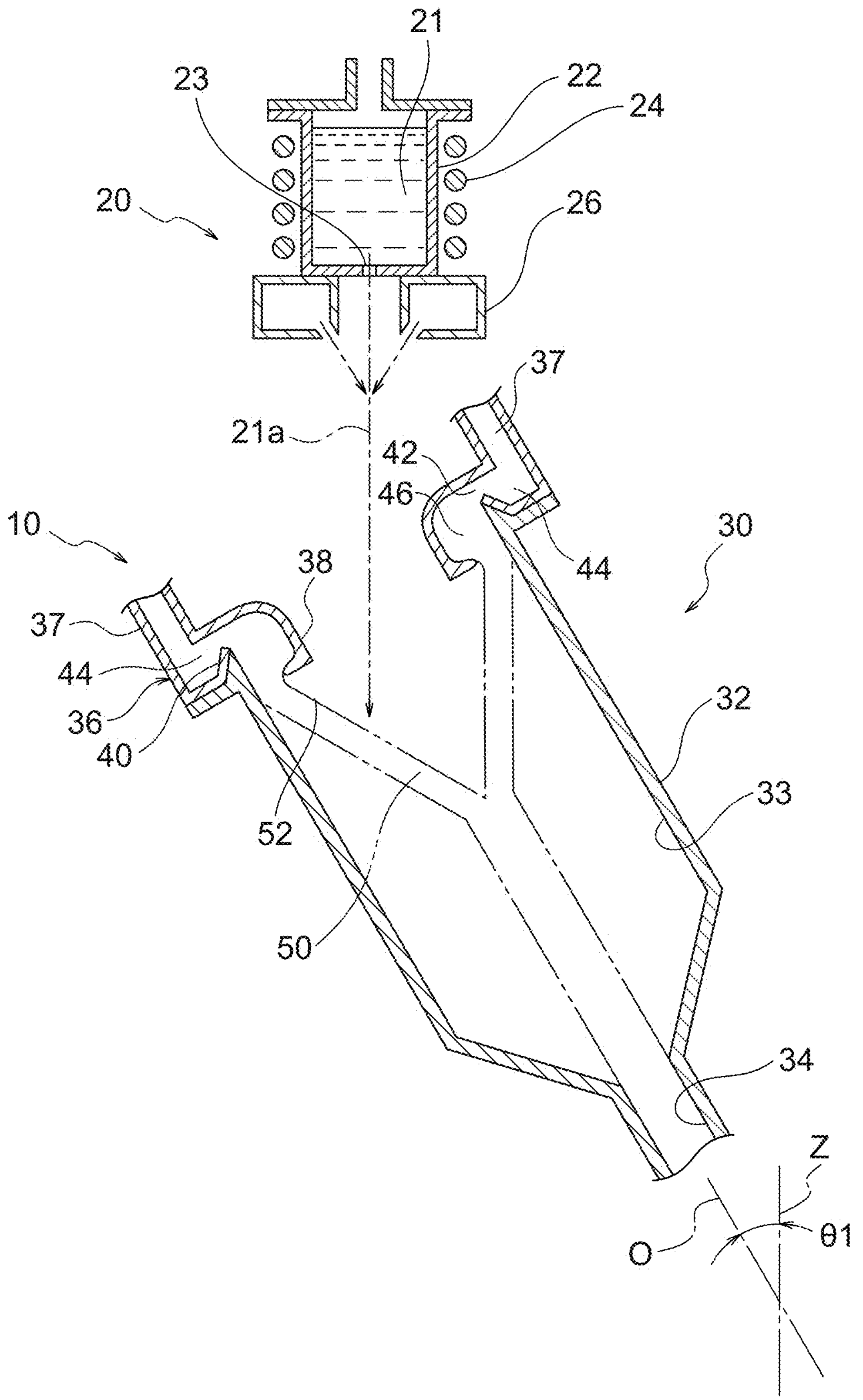
FIG. 10A is a schematic view of a metal powder manufacturing device.
Figure 10B:
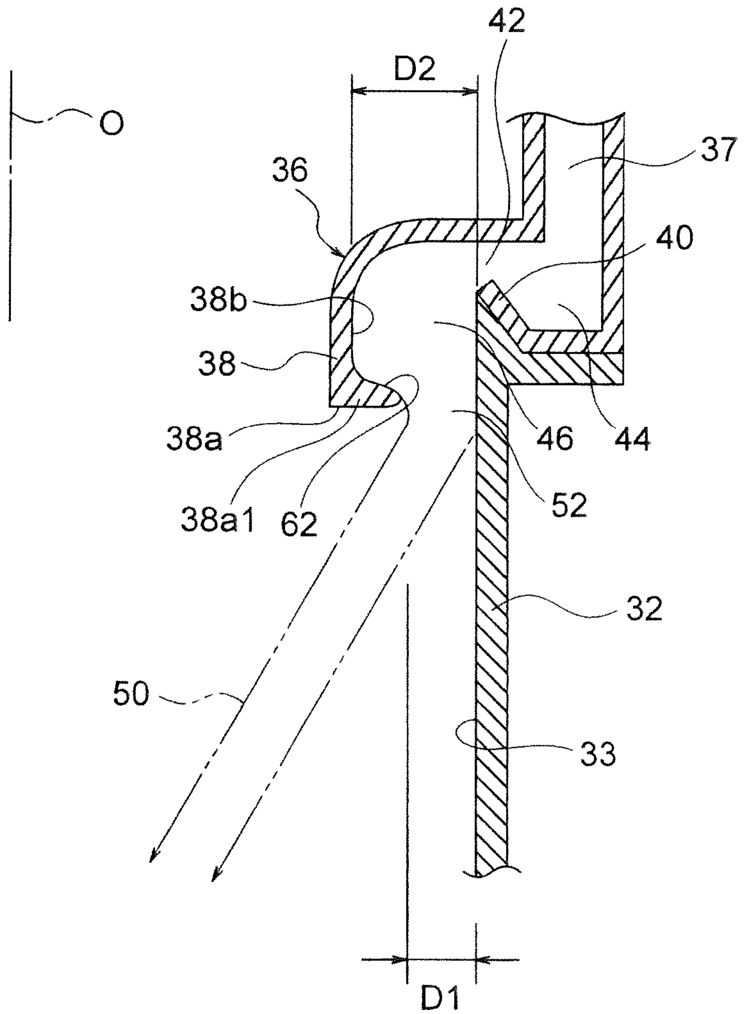
FIG. 10B is a schematic enlarged view of a main section in FIG. 10A.

The present inventors found that it is easy to obtain a soft magnetic powder having a satisfactory particle shape when using an atomization device shown in FIG. 10A and FIG. 10B as an atomization device.

As shown in FIG. 10A, an atomization device 10 includes a molten metal supply part 20 and a cooling unit 30 that is disposed on a downward side of the molten metal supply part 20 in a vertical direction. In the drawings, the vertical direction is a direction along a Z-axis.

The molten metal supply part 20 includes a heat-resistant container 22 that stores a molten metal 21. In the heat-resistant container 22, raw materials of respective metal elements weighed to be a composition of a finally obtained soft magnetic alloy powder are melted by a heating coil 24, thereby obtaining the molten metal 21. A temperature at the time of melting, that is, a temperature of the molten metal 21 may be determined in consideration of melting points of the raw materials of the respective metal elements and the melting point (Tm described above) of the molten metal 21, and may be set to 1200° C. to 1600° C. as an example.

The molten metal 21 is ejected as a dropped molten metal 21*a* from an ejection port 23 toward the cooling unit 30. A high-pressure gas is injected from a gas injection nozzle 26 toward the dropped molten metal 21_a_ that is ejected, and thus the dropped molten metal 21_a_ is converted into many droplets, and the droplets are carried toward an inner surface of a cylindrical body 32 in accordance with a flow of the gas.

As the gas injected from the gas injection nozzle 26, an inert gas or a reducing gas is preferable. As the inert gas, for example, a nitrogen gas, an argon gas, a helium gas, or the like can be used. As the reducing gas, for example, an ammonia decomposed gas or the like can be used. However, in a case where the molten metal 21 is a metal that is less likely to be oxidized, the gas injected from the gas injection nozzle 26 may be air.

The dropped molten metal 21_a_ carried toward the inner surface of the cylindrical body 32 collides with an inverted conical coolant flow 50 at the inside of the cylindrical body 32 and is further divided into fine droplets. The fine droplets are cooled and solidified into a solid alloy powder. An axial center O of the cylindrical body 32 is inclined at a predetermined angle θ1 with respect to a vertical line Z. The predetermined angle θ1 is not particularly limited, and is preferably 0° to 45°. In this angle range, it is easy to eject the dropped molten metal 21_a_ from the ejection port 23 toward the inverted conical coolant flow 50 at the inside of the cylindrical body 32.

A discharge portion 34 is provided on a downward side of the cylindrical body 32 along the axial center O, and the alloy powder included in the coolant flow 50 can be discharged to the outside in combination with the coolant. The alloy powder discharged in combination with the coolant is separated from the coolant in an external storage tank or the like and is output. Note that, as the coolant, cooling water may be used without a particular limitation.

Here, the average circularity of a finally obtained soft magnetic alloy powder can be adjusted by adjusting a water pressure of the cooling water. As the water pressure is lower, the average circularity of the finally obtained soft magnetic alloy powder becomes higher. However, when the water pressure is excessively low, the inverted conical coolant flow 50 is not obtained. However, a ratio of the deformed particles does not vary much even when changing the water pressure. Note that, there is no particular limitation to a method of adjusting the water pressure. The method may be appropriately determined depending on a method of supplying the cooling water. For example, in the case of supplying the cooling water with a pump, the water pressure of the cooling water can be adjusted by adjusting a pump pressure.

In this embodiment, since the dropped molten metal 21_a_ collides with the inverted conical coolant flow 50, flight time of droplets of the dropped molten metal 21_a_ is further shortened in comparison to a case where the coolant flow flows along the inner surface 33 of the cylindrical body 32. When the flight time is shortened, a rapid cooling effect is promoted, and the amorphization rate X of the obtained soft magnetic alloy powder is raised. In addition, the average circularity is likely to be high. In addition, when the flight time is shortened, the droplets of the dropped molten metal 21_a_ are less likely to be oxidized, and thus miniaturization of the obtained soft magnetic alloy powder is promoted, and quality of the soft magnetic alloy powder is also improved.

In this embodiment, in order to form the inverted conical coolant flow at the inside of the cylindrical body 32, a coolant flow in a coolant introduction portion (coolant outgoing portion) 36 for introducing the coolant to the inside of the cylindrical body 32 is controlled. FIG. 10B illustrates a configuration of the coolant introduction portion 36.

As shown in FIG. 10B, an outer portion (outer space portion) 44 located on an outer side in a diameter direction of the cylindrical body 32, and an inner portion (inner space portion) 46 located on an inner side in the diameter direction of the cylindrical body 32 are defined by a frame 38. The outer portion 44 and the inner portion 46 are partitioned by a partition portion 40, and the outer portion 44 and the inner portion 46 communicate with each other at a passage portion 42 formed on an upper side of the partition portion 40 in the direction of the axial center O. Accordingly, the coolant can flow.

Single or multiple nozzles 37 are connected to the outer portion 44, and the coolant enters the outer portion 44 from the nozzles 37. In addition, a coolant ejection portion 52 is formed on a downward side of the inner portion 46 in the direction of the axial center O, and the coolant inside the inner portion 46 is ejected (outgone) to the inside of the cylindrical body 32.

An outer peripheral surface of the frame 38 serves as a flow passage inner peripheral surface 38_b_ that guides the coolant flow inside the inner portion 46, and an outward convex portion 38_al_, which is continuous from the flow passage inner peripheral surface 38_b_ of the frame 38 and protrudes to an outer side in a radial direction, is formed at a lower end 38_a_ of the frame 38. Accordingly, a ring-shaped gap between a tip end of the outward convex portion 38_al_ and the inner surface 33 of the cylindrical body 32 serves as the coolant ejection portion 52. A flow passage deflection surface 62 is formed on a flow passage side upper surface of the outward convex portion 38_al_.

As shown in FIG. 10B, a diameter direction width D1 of the coolant ejection portion 52 is further narrowed than a diameter direction width D2 in a main portion of the inner portion 46 due to the outward convex portion 38_al_. Since D1 is narrower than D2, the coolant that descends inside the inner portion 46 along the flow passage inner peripheral surface 38_b_ to a downward side of the axial center O subsequently flows along the flow passage deflection surface 62 of the frame 38, and collides with the inner surface 33 of the cylindrical body 32 and is reflected from the inner surface. As a result, as shown in FIG. 10A, the coolant is ejected from the coolant ejection portion 52 to the inside of the cylindrical body 32 in the inverted conical shape to form the coolant flow 50. Note that, in a case where D1 is equal to D2, the coolant ejected from the coolant ejection portion 52 forms the coolant flow along the inner surface 33 of the cylindrical body 32.

D1/D2 is preferably ⅔ or less, more preferably ½ or less, and still more preferably 1/10 or greater.

Note that, the coolant flow 50 that flows out from the coolant ejection portion 52 is an inverted conical flow that straightly advances toward the axial center O from the coolant ejection portion 52, but may be a spiral inverted conical flow.

In addition, a gas injection temperature, a gas injection pressure, and the like may be appropriately set depending on a target particle size of the soft magnetic alloy powder. For example, the gas injection temperature may be room temperature or more to 200° C. or less. For example, the gas injection pressure may be 0.5 MPa to 19 MPa.

The soft magnetic alloy powder according to this embodiment is obtained by the above-described method. In order to appropriately control the particle shape and the particle size, it is preferable that the soft magnetic alloy powder is composed of the amorphous material and does not include crystals (nanocrystals).

It is preferable to perform a heat treatment with respect to the soft magnetic alloy powder that is obtained by the above-described gas atomization method and is composed of the amorphous material. For example, when performing the heat treatment at 350° C. to 575° C. for 0.1 to 2 hours, diffusion of elements is promoted while preventing respective powders from being sintered and being coarse, it can reach a thermodynamic equilibrium state within a short time, and distortion and stress can be removed. Note that, nanocrystals may precipitate at this point of time.

There is no particular limitation to usage of the soft magnetic alloy powder according to this embodiment, and the soft magnetic alloy powder can be appropriately used in usage requiring high relative permeability. Examples thereof include a magnetic core. Particularly, the soft magnetic alloy powder can be appropriately used as a magnetic core for power inductors. In addition, the soft magnetic alloy powder can be appropriately used in a magnetic component using the soft magnetic alloy powder, for example, a thin film inductor and a magnetic head. In addition, the magnetic core and the magnetic component using the soft magnetic alloy powder can be appropriately used in an electronic device.

Note that, the smaller average particle size of the soft magnetic alloy powder is, the further loss at high frequencies can be reduced. Accordingly, a soft magnetic alloy powder having a small average particle size can be appropriately used, particularly, in a component for high frequencies. In addition, the larger the average particle size of the soft magnetic alloy powder is, the more the permeability of the magnetic core is likely to be improved. Accordingly, a soft magnetic alloy powder having a large average particle size can be appropriately used in a component for which high permeability is required.

Second Embodiment

Hereinafter, a second embodiment will be described, but configurations which are not particularly described are the same as in the first embodiment.

The soft magnetic alloy powder of this embodiment is a soft magnetic alloy powder including a main component having a composition formula of $$(Co_{(1-(\alpha+\beta))}X1_{\alpha}X3_{\beta})_{(1-(a+b+c+d+e))}M_aB_bP_cSi_dCr_e \text{ (atom number ratio)},$$

in which

- X1 represents one or more selected from the group consisting of Fe and Ni,
- X3 represents one or more selected from the group consisting of Al, Mn, Ag, Zn, Sn, As, Sb, Cu, Bi, N, O, C, S, and rare-earth elements, M represents one or more selected from the group consisting of Nb, Hf, Zr, Ta, Mo, W, Ti, and V,
- $0<a\leq0.140$,
- $0.160<b\leq0.250$,
- $0\leq c\leq0.200$,
- $0\leq d\leq0.250$,
- $0\leq e\leq0.030$,
- $0.160<b+c+d+e$ 0.430,
- $0.500<1-(a+b+c+d+e)<0.840$,
- $\alpha\geq0$,
- $\beta\geq0$,
- $0\leq\alpha+\beta<0.50$ are satisfied,
- k (unit: Oe/MPa) satisfies $0\leq k\leq0.00100$, in which coercivity when applying a pressure $X_P$ to the soft magnetic alloy powder is set as $Y_H$, and a straight line obtained by linearly approximating a relationship between $X_P$ and $Y_H$ by a method of least squares is set as $Y_H=kX_P+1$.

In general, there is a tendency that a soft magnetic alloy powder having a composition including a large Co content has lower coercivity in comparison to a soft magnetic alloy powder having a composition including a large Fe content.

In addition, a magnetic core can be manufactured by molding the soft magnetic alloy powder. In addition, as a molding pressure is higher, the soft magnetic alloy powder can be packed at a higher density. When the soft magnetic alloy powder is packed at a high density, the relative permeability of the magnetic core can be improved.

However, in the case of manufacturing the magnetic core by molding the soft magnetic alloy powder, when the molding pressure is set to a high pressure to pack the soft magnetic alloy powder at a high density, distortion occurs at the inside of a magnetic substance (soft magnetic alloy powder). According to this, the coercivity of the magnetic core tends to increase and the relative permeability tends to decrease.

The soft magnetic alloy powder according to this embodiment has the above-described composition, and a variation in the coercivity in the case of pressing the soft magnetic alloy powder is small. Specifically, k (unit: Oe/MPa) satisfies $0\leq k\leq0.00100$ in which coercivity when applying a pressure $X_P$ to the soft magnetic alloy powder is set as $Y_H$, and a straight line obtained by linearly approximating a relationship between $X_P$ and $Y_H$ by a method of least squares is set as $Y_H=kX_P+1$. Note that, $0.00015\leq k\leq0.00095$ may be satisfied.

In a case where k is out of the above-described range, the higher the molding pressure is, the smaller an increasing ratio of the relative permeability of the magnetic core with respect to pressure rising becomes. In contrast, in a case where k is within the above-described range, the increase ratio of the relative permeability of the magnetic core with respect to an increase in the pressure is less likely to be reduced in comparison to a case where k is out of the above-described range. That is, when comparing the case of using the soft magnetic alloy powder in which k is within the above-described range and the case of using the soft magnetic alloy powder in which k is out of the above-described range, the higher the molding pressure is, the further a difference in the relative permeability of the obtained magnetic core increases.

Hereinafter, respective components of the soft magnetic alloy powder according to this embodiment will be described in detail.

The M content (a) satisfies $0<a\leq0.140$. $0.001\leq a\leq0.140$ may be satisfied. In addition, $0.003\leq a\leq0.100$ may be satisfied, $0.003\leq a\leq0.040$ may be satisfied and $0.020\leq a\leq0.040$ may be satisfied. In a case where M is not contained, the coercivity of the soft magnetic alloy powder becomes excessively high, and thus the relative permeability of the magnetic core decreases. In a case where the M content (a) is excessively large, k becomes excessively large. In addition, in a case where the pressure at the time of molding the soft magnetic alloy powder is high and the packing rate of the magnetic core is equal, the relative permeability of the magnetic core further decreases in comparison to a case where M content (a) is within the above-described range and k is small.

The B content (b) satisfies $0.160<b\leq0.250$. $0.180\leq b\leq0.250$ may be satisfied and $0.180\leq b\leq0.220$ may be satisfied. In a case where B content (b) is excessively small or in a case where B content (b) is excessively large, k becomes excessively high. In addition, in a case where the pressure at the time of molding the soft magnetic alloy powder is high and the packing rate of the magnetic core is equal, the relative permeability of the magnetic core further decreases in comparison to a case where B content (b) is within the above-described range and k is small.

The P content (c) satisfies $0 \le c \le 0.200$. That is, P may not be contained. $0 \le c \le 0.150$ may be satisfied, $0 \le c \le 0.050$ may be satisfied, or $0 \le c \le 0.010$ may be satisfied. In a case where P content (c) is excessively large, k becomes high. In addition, in a case where the pressure at the time of molding the soft magnetic alloy powder is high and the packing rate of the magnetic core is equal, the relative permeability of the magnetic core further decreases in comparison to a case where P content (c) is within the above-described range and k is small.

The Si content (d) satisfies $0 \le d \le 0.250$. That is, Si may not be contained. $0 \le d \le 0.200$ may be satisfied, $0 \le d \le 0.100$ may be satisfied, and $0.050 \le d \le 0.070$ may be satisfied. In a case where Si content (d) is excessively large, k becomes excessively high. In addition, in a case where the pressure at the time of molding the soft magnetic alloy powder is high and the packing rate of the magnetic core is equal, the relative permeability of the magnetic core further decreases in comparison to a case where Si content (d) is within the above-described range and k is small.

The Cr content (e) satisfies $0 \le e \le 0.030$. That is, Cr may not be contained. $0 \le e \le 0.020$ may be satisfied, $0 \le e \le 0.010$ may be satisfied, and $0 \le e \le 0.001$ may be satisfied. In a case where Cr content (e) is excessively large, k becomes excessively high. In addition, in a case where the pressure at the time of molding the soft magnetic alloy powder is high and the packing rate of the magnetic core is equal, the relative permeability of the magnetic core further decreases in comparison to a case where Cr content (e) is within the above-described range and k is small.

In addition, the soft magnetic alloy powder according to this embodiment satisfies $0.160 < b+c+d+ \le e \le 0.430$. $0.180\ b+c+d+ \le e \le 0.430$ may be satisfied, and $0.180 < b+c+d+ \le e \le 0.400$ may be satisfied. In a case where b+c+d+e is excessively large, k becomes excessively high. In addition, the relative permeability of the magnetic core further decreases in a case where b+c+d+e is excessively large and k becomes excessively high in comparison to a case where b+c+d+e is within the above-described range and k is small, in a case where the pressure at the time of molding the soft magnetic alloy powder is high and the packing rate of the magnetic core is equal, In addition, the soft magnetic alloy powder according to this embodiment satisfies $0.500 < 1-(a+b+c+d+e) < 0.840$. $0.550 \le 1-(a+b+c+d+e) \le 0.800$ may be satisfied, and $0.580 \le 1-(a+b+c+d+e) \le 0.800$ may be satisfied. In a case where 1−(a+b+c+d+e) is excessively small, the saturation magnetic flux density tends to be low. In a case where 1−(a+b+c+d+e) is excessively large, the coercivity tends to be high.

In addition, in the soft magnetic alloy powder of this embodiment, a part of Co may be substituted with X1 and/or X3.

X1 represents one or more selected from the group consisting of Fe and Ni. With regard to the X1 content, a may be zero. That is, X1 may not be contained. In addition, when the number of atoms of the entirety of the composition is set as 100 at %, the number of atoms of X1 may be 40 at % or less. That is, $0 \le \alpha\{1-(a+b+c+d+e)\}0.400$ may be satisfied. In addition, $0 \le \alpha\{1-(a+b+c+d+e)\}0.360$ may be satisfied, and $0 \le \alpha\{1-(a+b+c+d+e)\}0.144$ may be satisfied. In addition, in a case where Fe is slightly contained, the coercivity is more likely to decrease and the relative permeability is more likely to be high in comparison to a case where Fe is not contained at all. Particularly, in a case where Co/Fe is 5 to 20 in the atom number ratio, the coercivity is likely to decrease and the relatively permeability is likely to be high.

X3 represents one or more selected from the group consisting of Al, Mn, Ag, Zn, Sn, As, Sb, Cu, Bi, N, O, C, S, and rare earth elements. X3 may be one or more selected from the group consisting of Al, Zn, Sn, Cu, Bi, La, Y, N, O, C, and S. With regard to the X3 content, β may be zero. That is, X3 may not be contained. In addition, when the number of atoms of the entirety of the composition is set as 100 at %, the number of atoms of X3 may be 5.0 at % or less. That is, $0 \le \beta\{1-(a+b+c+d+e)\}0.050$ may be satisfied.

A range of the substitution content of Co with X1 and/or X3 is set to satisfy $0 \le \alpha+\beta < 0.50$. in the case of satisfying $\alpha+\beta > 0.50$, k becomes excessively high. In addition, in a case where the pressure at the time of molding the soft magnetic alloy powder is high and the packing rate of the magnetic core is equal, the relative permeability of the magnetic core further decreases in comparison to a case where $0 \le \alpha+\beta < 0.50$ is satisfied, and k is small. Note that, $0 \le \alpha+\beta \le 0.50$ may be satisfied.

Note that, the soft magnetic alloy powder of this embodiment may contain inevitable impurities other than the elements contained as the main component in a range that does not significantly affect characteristics such as the relative permeability. For example, the inevitable impurities may be contained in an content of 0.1% by mass or less with respect to 100% by mass of soft magnetic alloy powder.

Hereinafter, a method of measuring k in the soft magnetic alloy powder of this embodiment will be described. First, a method of manufacturing a compressed soft magnetic alloy powder will be described.

2 g of the soft magnetic alloy powder of this embodiment is weighed. In a case where the content of the powder is too large or too small, a result may be inaccurate.

Next, the weighed powder is put into a mold having ϕ of 8 mm. In a case where the diameter of the mold is too large or too small, a result may be inaccurate.

Next, the powder put into the mold is compressed at a specific pressure $X_P$ for 30 seconds by a hand press.

Next, the compressed powder is taken out from the mold, thereby obtaining the compressed powder.

In measurement of k, three kinds of powders including a powder in which the pressure $X_P$ at the time of being compressed is set to 400 MPa, a powder in which the pressure $X_P$ is set to 800 MPa, and a powder that is not compressed are prepared. $X_P$ of the powder that is not compressed is set to 0 MPa. In addition, coercivity (unit: Oe) of the respective powders is measured. In addition, in a state in which coercivity when applying the pressure $X_P$ is set as $Y_H$, and a straight line obtained by linearly approximating a relationship between $X_P$ and $Y_H$ by a method of least squares is set as $Y_H = kX_P + 1$, k (unit: Oe/MPa) that is a slope of the approximated straight line is calculated. Note that, the soft magnetic alloy powder of this embodiment does not become solid even when being compressed for 30 seconds at $X_P$ of 400 MPa or 800 MPa.

In this embodiment, there is no particular limitation to the average particle size of the soft magnetic powder. For example, the average particle size may be 5 to 50 μm.

The method of manufacturing the soft magnetic alloy powder by the gas atomization method is similar as in the first embodiment. In order appropriately control k, it is preferable that the soft magnetic alloy powder at this point of time is composed of the amorphous material and does not contain crystals (nanocrystals).

A heat treatment may be performed with respect to the soft magnetic alloy powder that is obtained by the above-described gas atomization method and is composed of the amorphous material. In the case of performing the heat treatment, for example, when performing the heat treatment for 0.1 to 2 hours at 250° C. to 600° C., preferably 250° C. to 550° C., and more preferably 250° C. to 450° C., diffusion of elements is promoted while preventing respective powders from being sintered and being coarse, it can reach a thermodynamic equilibrium state within a short time, and distortion and stress can be removed. Note that, crystallization may progress by the heat treatment, but it is preferable to perform the heat treatment at as low as temperature at which crystals having a grain size exceeding 100 nm do not precipitate. In addition, when performing the heat temperature at appropriate temperature and time, k can be lowered, and particularly, the relative permeability of the magnetic core in a case where the molding pressure is high can be improved. Note that, nanocrystals may precipitate at this point of time. However, in a case where the heat treatment temperature is excessively high or the heat treatment time is excessively long, k becomes excessively high. In addition, in a case where the pressure at the time of molding the soft magnetic alloy powder is high, and the packing rate of the magnetic core is equal, the relative permeability of the magnetic core further decreases in comparison to a case where the heat treatment temperature and the heat treatment time are appropriate and k is small.

There is no particular limitation to usage of the soft magnetic alloy powder according to this embodiment, and the soft magnetic alloy powder can be appropriately used in usage requiring high relative permeability. Examples thereof include a magnetic core. Particularly, the soft magnetic alloy powder can be appropriately used as a magnetic core for power inductors. In addition, the soft magnetic alloy powder can be appropriately used in a magnetic component using the soft magnetic alloy powder, for example, a thin film inductor and a magnetic head. In addition, the magnetic core and the magnetic component using the soft magnetic alloy powder can be appropriately used in an electronic device.

EXAMPLES

Hereinafter, the invention will be described in detail with reference to examples.

Experimental Example 1

Ingots of various materials were prepared and weighing was performed to obtain a mother alloy having a composition shown in Table 1. In addition, the weighed ingots were stored in a crucible disposed in a gas atomization device.

Next, the mother alloy was stored in the heat-resistant container 22 disposed inside the atomization device 10. Next, the inside of the cylindrical body 32 was evacuated, the heat-resistant container 22 was heated by high-frequency induction by using a heating coil 24 provided at the outside of the heat-resistant container 22 to melt and mix raw material metals inside the heat-resistant container 22, thereby obtaining a molten metal.

The obtained molten metal was injected to the inside of a cylindrical body 32 of the cooling unit 30 at an atomization temperature described in Table 1, and an argon gas was injected at an injection gas pressure of 7 MPa, thereby forming many droplets. The droplets collided with an inverted conical cooling water flow by cooling water supplied at a pump pressure of 10 MPa, and the droplets were converted into fine powders and were collected. However, in Sample Nos. 3 and 4 in Table 1, the atomization temperature was excessively low, and thus the molten metal could not be injected.

Note that, in the atomization device 10 shown in FIG. 10A and FIG. 10B, an inner diameter of the inner surface of the cylindrical body 32 was 300 mm, D1/D2 was ½, and the angle θ1 was 20°.

In addition, in Experimental Example 1, the heat treatment was performed at 475° C. for 60 minutes. In addition, it was confirmed that the composition of the mother alloy and the composition of the soft magnetic alloy powder approximately match each other by ICP analysis.

It was confirmed that each of obtained soft magnetic alloy powders included an amorphous material or included a nanocrystal material. The amorphization rate X was calculated by using XRD. A soft magnetic powder in which X was 85% or more was described as "amorphous" in a microstructure column. With regard to a case where the amorphization rate was less than 85%, it was confirmed whether or not to include crystals greater than nanocrystals through evaluation on a crystallite size by using Scherrer formula in XRD. In a case where crystals greater than nanocrystals were not included, it was described as "amorphous+nanocrystal", and in a case where crystals greater than nanocrystals were included, it was described as "crystal". Results are shown in Table 1.

The shape of the powder particles in each of the obtained soft magnetic alloy powders was evaluated. Specifically, the circularity of 20,000 particles was measured, and the average circularity on the number basis and the cumulative number ratio from a side where the circularity was lowest to a side where the circularity was 0.50 was calculated. Results are shown Table 1. In addition, with respect to respective examples and comparative examples, in a case where the cumulative number ratio was 2.0% or less, the number of deformed particles was small, and in a case where the cumulative number ratio was 1.5% or less, the number of deformed particles was particularly small. In addition, with respect to the respective examples and comparative examples, a state in which the average particle size (D50) on the volume basis is approximately 25 μm was confirmed by using a laser diffraction type particle size distribution measurement device (HELOS&RODOS (manufactured by Sympatec GmbH)).

With respect to the each of the obtained soft magnetic alloy powders, DSC measurement was performed by using STA449F3 (manufactured by NETZSCH) to confirm whether or not Tg exists. In addition, measurement of Tm and ΔT was performed. Results are shown in Table 1.

The coercivity He of each of the obtained soft magnetic alloy powder was measured by using K-HC1000 type (manufactured by TOHOKU STEEL Co., Ltd.).

Results are shown in Table 1. There was no particular limitation to Hc. He might be 0.50 Oe or less. He was preferably 0.20 Oe or less.

Next, a toroidal core was prepared from each of the soft magnetic alloy powder. Specifically, a phenol resin as an insulating binder was mixed to the soft magnetic alloy powder as the phenol resin's content was 3 mass % with respect to the entirety, and the resultant mixture was granulated to a granulated powder having a size of approximately 500 μm by using a typical planetary mixer as a stirrer. Next, the obtained granulated powder was molded at a surface pressure of 4 ton/cm$^2$ (392 MPa) to prepare a green compact in a toroidal shape having an outer diameter of 13 mmϕ, an inner diameter of 8 mmϕ, and a height of 6 mm. The obtained green compact was cured at 150° C. to prepare a toroidal core.

A UEW wire was wound around the toroidal core, and p (relative permeability) was measured at 100 kHz by using 4284A PRECISION LCR METER (manufactured by HP Development Company, L.P.). Results are shown in Table 1. Note that, with regard to the relative permeability μ, the case of 30 or more was determined as satisfactory.

TABLE 1

| Example/ Comparative Example | Sample No. | $(Co_{1-\alpha}Fe_{\alpha})_{1-(a+b+c+d+e+f)}M_aB_bP_cSi_dCr_eS_f$ (β = 0) Co | Fe | M (Nb) a | B b | P c | Si d | Cr e | S f | Co/B | Atomization temperature (° C.) |
|---|---|---|---|---|---|---|---|---|---|---|---|
| Comparative Example | 1a | 0.000 | 0.720 | 0.020 | 0.180 | 0.010 | 0.070 | 0.000 | 0.000 | 0.000 | 1650 |
| Comparative Example | 1 | 0.000 | 0.720 | 0.020 | 0.180 | 0.010 | 0.070 | 0.000 | 0.000 | 0.000 | 1600 |
| Comparative Example | 2 | 0.000 | 0.720 | 0.020 | 0.180 | 0.010 | 0.070 | 0.000 | 0.000 | 0.000 | 1500 |
| Comparative Example | 3 | 0.000 | 0.720 | 0.020 | 0.180 | 0.010 | 0.070 | 0.000 | 0.000 | 0.000 | 1400 |
| Comparative Example | 4 | 0.000 | 0.720 | 0.020 | 0.180 | 0.010 | 0.070 | 0.000 | 0.000 | 0.000 | 1300 |
| Example | 5a | 0.720 | 0.000 | 0.020 | 0.180 | 0.010 | 0.070 | 0.000 | 0.000 | 4.000 | 1650 |
| Example | 5 | 0.720 | 0.000 | 0.020 | 0.180 | 0.010 | 0.070 | 0.000 | 0.000 | 4.000 | 1600 |
| Example | 6 | 0.720 | 0.000 | 0.020 | 0.180 | 0.010 | 0.070 | 0.000 | 0.000 | 4.000 | 1500 |
| Example | 7 | 0.720 | 0.000 | 0.020 | 0.180 | 0.010 | 0.070 | 0.000 | 0.000 | 4.000 | 1400 |
| Example | 8 | 0.720 | 0.000 | 0.020 | 0.180 | 0.010 | 0.070 | 0.000 | 0.000 | 4.000 | 1300 |

| Example/ Comparative Example | | Tg | ΔT = Tx-Tg (° C.) | Tm (° C.) | Microstructure | Average circularity | Cumulative number ratio (%) | Hc (Oe) | Relative permeability μ |
|---|---|---|---|---|---|---|---|---|---|
| Comparative Example | 1a | None | — | 1300 | Amorphous | 0.89 | 2.3 | 1.10 | 21 |
| Comparative Example | 1 | None | — | 1300 | Amorphous | 0.88 | 2.2 | 1.20 | 22 |
| Comparative Example | 2 | None | — | 1300 | Amorphous | 0.85 | 2.1 | 1.40 | 18 |
| Comparative Example | 3 | Injection was impossible | | | | | | | |
| Comparative Example | 4 | Injection was impossible | | | | | | | |
| Example | 5a | Existed | 33 | 1150 | Amorphous | 0.92 | 2.0 | 0.12 | 33 |
| Example | 5 | Existed | 35 | 1150 | Amorphous | 0.95 | 1.5 | 0.05 | 35 |
| Example | 6 | Existed | 36 | 1150 | Amorphous | 0.96 | 1.4 | 0.04 | 36 |
| Example | 7 | Existed | 38 | 1150 | Amorphous | 0.96 | 1.4 | 0.03 | 36 |
| Example | 8 | Existed | 40 | 1150 | Amorphous | 0.97 | 1.4 | 0.03 | 38 |

As can be seen from Table 1, in Sample Nos. 1 to 4 and 1a which were Fe-based soft magnetic alloys composed of the amorphous material, since Tm was high, the atomization temperature necessary for injection was as high as 1500° C. or higher. That is, a range of the atomization temperature at which the soft magnetic alloy powder could be manufactured was narrow. In addition, the obtained soft magnetic alloy powder did not have Tg. Accordingly, the coercivity of the soft magnetic alloy powder was high, the circularity was low, and the number of deformed particles was large. In addition, the relative permeability μ of the toroidal core manufactured by using the soft magnetic alloy powder was low.

In contrast, in Sample Nos. 5 to 8, and 5a having a composition including a lot of Co, since Tm was low, the atomization temperature necessary for injection was low, and injection could be performed at the atomization temperature of 1300° C. That is, a range of the atomization temperature at which the soft magnetic alloy powder could be manufactured was wide. In addition, the obtained soft magnetic alloy powders had Tg. Accordingly, in the obtained soft magnetic alloy powders, the coercivity was low, the circularity was high, and the number of deformed particles was small. In addition, the relative permeability μ of the toroidal core manufactured by using the soft magnetic alloy powder was high.

Experimental Example 2

In Experimental Example 2, soft magnetic alloy powders and toroidal cores of Sample Nos. 9 and 10 were manufactured under the conditions described in Experimental Example 1 except that a pump pressure for supplying cooling water was changed from Sample No. 1. Results are shown in Table 2.

TABLE 2

| Example/ Comparative Example | Sample No. | Co | Fe | M (Nb) a | B b | P c | Si d | Cr e | S f | Co/B | Tg | ΔT = Tx-Tg |
|---|---|---|---|---|---|---|---|---|---|---|---|---|
| | | $(Co_{1-\alpha}Fe_{\alpha})_{1-(a+b+c+d+e+f)}M_aB_bP_cSi_dCr_eS_f$ (β = 0) | | | | | | | | | | |
| Comparative Example | 1 | 0.000 | 0.720 | 0.020 | 0.180 | 0.010 | 0.070 | 0.000 | 0.000 | 0.000 | None | — |
| Comparative Example | 9 | 0.000 | 0.720 | 0.020 | 0.180 | 0.010 | 0.070 | 0.000 | 0.000 | 0.000 | None | — |
| Comparative Example | 10 | 0.000 | 0.720 | 0.020 | 0.180 | 0.010 | 0.070 | 0.000 | 0.000 | 0.000 | None | — |
| Example | 8 | 0.720 | 0.000 | 0.020 | 0.180 | 0.010 | 0.070 | 0.000 | 0.000 | 4.000 | Existed | 40 |

| Example/ Comparative Example | Sample No. | Tm (° C.) | Atomization temperature (° C.) | Pump pressure | Microstructure | Average circularity | Cumulative number ratio | Hc (Oe) | Relative permeability μ |
|---|---|---|---|---|---|---|---|---|---|
| Comparative Example | 1 | 1300 | 1600 | 10 MPa | Amorphous | 0.92 | 2.3 | 1.20 | 23 |
| Comparative Example | 9 | 1300 | 1600 | 7.5 MPa | Amorphous | 0.95 | 2.2 | 1.13 | 22 |
| Comparative Example | 10 | 1300 | 1600 | 5.0 MPa | Amorphous | 0.97 | 2.1 | 1.10 | 23 |
| Example | 8 | 1150 | 1300 | 10 MPa | Amorphous | 0.97 | 1.3 | 0.03 | 38 |

As can be seen from Table 2, when lowering the pump pressure, the average circularity of powders of the soft magnetic alloy powders was improved. However, a variation in the cumulative number ratio was small, and a variation in the ratio of the deformed particles was small. Since Sample Nos. 9 and 10 were Fe-based soft magnetic alloys composed of the amorphous material, Tm was high. In addition, the obtained soft magnetic alloy powders did not have Tg. Accordingly, the coercivity of the soft magnetic alloy powders was high, and the number of deformed particles was large. In addition, the relative permeability μ of the toroidal cores manufactured by using the soft magnetic alloy powders was low.

Experimental Example 3

In Experimental Example 3, soft magnetic alloy powders and toroidal cores of Sample Nos. 9 to 16 were manufactured under the conditions described in Experimental Example 1 except that a part of Co was substituted with Fe differently from Sample No. 8. Results are shown in Table 3.

In addition, soft magnetic alloy powders and toroidal cores of Sample Nos. 8a to 8e were manufactured under the same conditions as in Sample No. 8 except that the composition was changed. Results are shown in Table 3A.

TABLE 3

| Example/ Comparative Example | Sample No. | Co | Fe | M (Nb) a | B b | P c | Si d | Cr e | S f | Co/B | Tg |
|---|---|---|---|---|---|---|---|---|---|---|---|
| | | $(Co_{1-\alpha}Fe_{\alpha})_{1-(a+b+c+d+e+f)}M_aB_bP_cSi_dCr_eS_f$ (β = 0) | | | | | | | | | |
| Example | 8 | 0.720 | 0.000 | 0.020 | 0.180 | 0.010 | 0.070 | 0.000 | 0.000 | 4.000 | Existed |
| Example | 11 | 0.648 | 0.072 | 0.020 | 0.180 | 0.010 | 0.070 | 0.000 | 0.000 | 3.600 | Existed |
| Example | 12 | 0.576 | 0.144 | 0.020 | 0.180 | 0.010 | 0.070 | 0.000 | 0.000 | 3.200 | Existed |
| Example | 13 | 0.504 | 0.216 | 0.020 | 0.180 | 0.010 | 0.070 | 0.000 | 0.000 | 2.800 | Existed |
| Example | 14 | 0.432 | 0.288 | 0.020 | 0.180 | 0.010 | 0.070 | 0.000 | 0.000 | 2.400 | Existed |
| Comparative Example | 16 | 0.288 | 0.432 | 0.020 | 0.180 | 0.010 | 0.070 | 0.000 | 0.000 | 1.600 | |

TABLE 3-continued

| Example/ Comparative Example | Sample No. | ΔT = Tx-Tg (° C.) | Tm (° C.) | Micro-structure | Average circularity | Cumulative number ratio (%) | Hc (Oe) | Relative permeability μ |
|---|---|---|---|---|---|---|---|---|
| Example | 8 | 10 | 1150 | Amorphous | 0.97 | 1.3 | 0.03 | 38 |
| Example | 11 | 41 | 1160 | Amorphous | 0.98 | 1.2 | 0.02 | 10 |
| Example | 12 | 10 | 1170 | Amorphous | 0.96 | 1.4 | 0.03 | 38 |
| Example | 13 | 38 | 1180 | Amorphous | 0.96 | 1.2 | 0.05 | 34 |
| Example | 14 | 35 | 1190 | Amorphous | 0.95 | 1.2 | 0.10 | 32 |
| Comparative Example | 16 | | | Injection was impossible | | | | |

TABLE 3A

| Example/ Comparative Example | Sample No. | $(Co_{1-\alpha}Fe_{\alpha})_{1-(a+b+c+d+e+f)}M_aB_bP_cSi_dCr_eS_f$ ($\beta$ = 0) Co | Fe | M (Nb) a | B b | P c | Si d | Cr e | S f | Co/B | Tg | ΔT = Tx-Tg (° C.) |
|---|---|---|---|---|---|---|---|---|---|---|---|---|
| Example | 8a | 0.832 | 0.000 | 0.003 | 0.165 | 0.000 | 0.000 | 0.000 | 0.000 | 5.042 | Existed | 24 |
| Example | 8b | 0.827 | 0.000 | 0.003 | 0.170 | 0.000 | 0.000 | 0.000 | 0.000 | 4.865 | Existed | 24 |
| Example | 8c | 0.817 | 0.000 | 0.003 | 0.180 | 0.000 | 0.000 | 0.000 | 0.000 | 4.539 | Existed | 24 |
| Example | 8d | 0.747 | 0.000 | 0.003 | 0.180 | 0.000 | 0.070 | 0.000 | 0.000 | 4.150 | Existed | 21 |
| Example | 8e | 0.737 | 0.000 | 0.003 | 0.180 | 0.010 | 0.070 | 0.000 | 0.000 | 4.094 | Existed | 22 |
| Example | 8 | 0.720 | 0.000 | 0.020 | 0.180 | 0.010 | 0.070 | 0.000 | 0.000 | 4.000 | Existed | 40 |

| Example/ Comparative | Sample No. | Tm (° C.) | Microstructure | Average circularity | Cumulative number ratio (%) | Hc (Oe) | Relative permeability μ |
|---|---|---|---|---|---|---|---|
| Example | 8a | 1200 | Amorphous | 0.92 | 2.3 | 0.08 | 35 |
| Example | 8b | 1195 | Amorphous | 0.93 | 2.0 | 0.07 | 36 |
| Example | 8c | 1190 | Amorphous | 0.94 | 1.9 | 0.07 | 36 |
| Example | 8d | 1160 | Amorphous | 0.97 | 1.2 | 0.04 | 37 |
| Example | 8e | 1170 | Amorphous | 0.97 | 1.4 | 0.03 | 38 |
| Example | 8 | 1150 | Amorphous | 0.97 | 1.3 | 0.03 | 38 |

As can be seen from Table 3, in Sample Nos. 11 to 14 having a composition within a predetermined range, a particle shape was satisfactory, and the relative permeability μ of the toroidal core was satisfactory. In Sample No. 11 to 14, there was a tendency that the further the Fe content increased, the further Tm was raised, the further the coercivity increased, and the further the relative permeability μ decreased. In addition, in Sample No. 16 in which $\alpha+\beta>0.500$ and a content ratio of Co was excessively small, the melting point of a soft magnetic alloy was excessively high, and thus a molten metal could not be injected as the atomization temperature of 1300° C. However, in Sample No. 11 in which the atom number ratio of Co/Fe was 5 to 20, the coercivity further decreased, and the relative permeability μ further increased in comparison to Sample Nos. 8 and 12 in which the atom number ratio was out of the described range.

As can be seen from Table 3A, each sample which has a composition within a predetermined range and Tg, and in which Tm is a predetermined range, the atomization temperature necessary for injection was low, and injection could be performed at the atomization temperature of 1300° C. That is, a range of the atomization temperature at which the soft magnetic alloy powders could be manufactured was wide. In addition, the obtained soft magnetic alloy powder had Tg. Accordingly, the coercivity of the soft magnetic alloy powder was low, the circularity was high, and the number of deformed particles was small. In addition, the relative permeability μ of the toroidal cores manufactured by using the soft magnetic alloy powders was high. In addition, in a case where Co/B was higher in comparison to Sample No. 8, there was a tendency that the higher Co/B was, the further Tm was raised, the further the average circularity decreased, the further the coercivity increased, and the further the relative permeability p decreased.

Experimental Example 4

In Experimental Example 4, soft magnetic alloy powders and toroidal cores were manufactured under the same conditions as in Experimental Example 3 and Sample No. 11 except that the content of each element contained as a main component was changed. Results are shown in Table 4 to Table 7.

TABLE 4

| Example/ Comparative Example | Sample No. | Co | Fe | M (Nb) a | B b | P c | Si d | Cr e | S F | Co/B | Tg |
|---|---|---|---|---|---|---|---|---|---|---|---|
| | | $(Co_{1-\alpha}Fe_{\alpha})_{1-(a+b+c+d+e+f)}M_aB_bP_cSi_dCr_eS_f$ (β = 0) | | | | | | | | | |
| Comparative Example | 17 | 0.666 | 0.074 | 0.000 | 0.180 | 0.010 | 0.070 | 0.000 | 0.000 | 3.700 | None |
| Example | 8 | 0.665 | 0.074 | 0.001 | 0.180 | 0.010 | 0.070 | 0.000 | 0.000 | 3.695 | Existed |
| Example | 19 | 0.663 | 0.074 | 0.003 | 0.180 | 0.010 | 0.070 | 0.000 | 0.000 | 3.685 | Existed |
| Example | 20 | 0.630 | 0.070 | 0.040 | 0.180 | 0.010 | 0.070 | 0.000 | 0.000 | 3.500 | Existed |
| Example | 21 | 0.576 | 0.064 | 0.100 | 0.180 | 0.010 | 0.070 | 0.000 | 0.000 | 3.200 | Existed |
| Example | 22 | 0.540 | 0.060 | 0.140 | 0.180 | 0.010 | 0.070 | 0.000 | 0.000 | 3.000 | Existed |
| Comparative Example | 23 | 0.531 | 0.059 | 0.150 | 0.180 | 0.010 | 0.070 | 0.000 | 0.000 | 2.950 | Existed |

| Example/ Comparative Example | Sample No. | ΔT = Tx-Tg (° C.) | Tm (° C.) | Micro-structure | Aver-age circu-larity | Cumu-lative number ratio (%) | Hc (Oe) | Rela-tive perme-ability μ |
|---|---|---|---|---|---|---|---|---|
| Comparative Example | 17 | 1 | 1185 | Amorphous | 0.87 | 2.3 | 1.00 | 22 |
| Example | 8 | 15 | 1180 | Amorphous | 0.95 | 1.5 | 0.25 | 31 |
| Example | 19 | 22 | 1175 | Amorphous | 0.96 | 1.3 | 0.15 | 35 |
| Example | 20 | 25 | 1105 | Amorphous | 0.96 | 1.2 | 0.06 | 36 |
| Example | 21 | 29 | 1010 | Amorphous | 0.96 | 1.3 | 0.04 | 36 |
| Example | 22 | 67 | 905 | Amorphous | 0.98 | 1.3 | 0.14 | 31 |
| Comparative Example | 23 | 68 | 875 | Amorphous | 0.88 | 2.5 | 0.82 | 28 |

TABLE 5

| Example/ Comparative Example | Sample No. | Co | Fe | M (Nb) a | B b | P c | Si d | Cr e | S f | Co/B |
|---|---|---|---|---|---|---|---|---|---|---|
| | | $(Co_{1-\alpha}Fe_{\alpha})_{1-(a+b+c+d+e+f)}M_aB_bP_cSi_dCr_eS_f$ (β = 0) | | | | | | | | |
| Comparative Example | 24 | 0.666 | 0.074 | 0.020 | 0.160 | 0.010 | 0.070 | 0.000 | 0.000 | 4.163 |
| Example | 11 | 0.648 | 0.072 | 0.020 | 0.180 | 0.010 | 0.070 | 0.000 | 0.000 | 3.600 |
| Example | 25 | 0.612 | 0.068 | 0.020 | 0.220 | 0.010 | 0.070 | 0.000 | 0.000 | 2.782 |
| Example | 26 | 0.585 | 0.065 | 0.020 | 0.250 | 0.010 | 0.070 | 0.000 | 0.000 | 2.340 |
| Comparative Example | 27 | 0.576 | 0.064 | 0.020 | 0.260 | 0.010 | 0.070 | 0.000 | 0.000 | 2.215 |
| Example | 28 | 0.657 | 0.073 | 0.020 | 0.180 | 0.000 | 0.070 | 0.000 | 0.000 | 3.650 |
| Example | 29 | 0.630 | 0.070 | 0.020 | 0.180 | 0.030 | 0.070 | 0.000 | 0.000 | 3.500 |
| Example | 30 | 0.612 | 0.068 | 0.020 | 0.180 | 0.050 | 0.070 | 0.000 | 0.000 | 3.400 |
| Example | 31 | 0.567 | 0.063 | 0.020 | 0.180 | 0.100 | 0.070 | 0.000 | 0.000 | 3.150 |
| Example | 32 | 0.522 | 0.058 | 0.020 | 0.180 | 0.150 | 0.070 | 0.000 | 0.000 | 2.900 |
| Example | 33 | 0.522 | 0.058 | 0.020 | 0.180 | 0.200 | 0.020 | 0.000 | 0.000 | 2.900 |
| Comparative Example | 34 | 0.522 | 0.058 | 0.020 | 0.180 | 0.210 | 0.010 | 0.000 | 0.000 | 2.900 |
| Example | 35 | 0.720 | 0.080 | 0.020 | 0.180 | 0.000 | 0.000 | 0.000 | 0.000 | 4.000 |
| Example | 36 | 0.675 | 0.075 | 0.020 | 0.180 | 0.000 | 0.050 | 0.000 | 0.000 | 3.750 |
| Example | 37 | 0.630 | 0.070 | 0.020 | 0.180 | 0.000 | 0.100 | 0.000 | 0.000 | 3.500 |
| Example | 38 | 0.585 | 0.065 | 0.020 | 0.180 | 0.000 | 0.150 | 0.000 | 0.000 | 3.250 |
| Example | 39 | 0.540 | 0.060 | 0.020 | 0.180 | 0.000 | 0.200 | 0.000 | 0.000 | 3.000 |
| Example | 40 | 0.495 | 0.055 | 0.020 | 0.180 | 0.000 | 0.250 | 0.000 | 0.000 | 2.750 |
| Comparative Example | 41 | 0.486 | 0.054 | 0.020 | 0.180 | 0.000 | 0.260 | 0.000 | 0.000 | 2.700 |

TABLE 5-continued

| Example/ Comparative Example | Sample No. | Tg | Δ = Tx-Tg (° C.) | Tm (° C.) | Micro-structure | Aver-age circu-larity | Cumu-lative number ratio (%) | Hc (Oe) | Rela-tive perme-ability μ |
|---|---|---|---|---|---|---|---|---|---|
| Comparative | 24 | Injection was impossible | | | | | | | |
| Example | | Existed | 41 | 1160 | Amorphous | 0.98 | 1.2 | 0.02 | 40 |
| Example | 11 | Existed | 45 | 1010 | Amorphous | 0.96 | 1.3 | 0.04 | 36 |
| Example | 25 | Existed | 48 | 905 | Amorphous | 0.98 | 1.3 | 0.14 | 31 |
| Example | 26 | Existed | 52 | 875 | Amorphous | 0.85 | 2.5 | 0.57 | 28 |
| Comparative | 27 | | | | | | | | |
| Example | | Existed | 43 | 1215 | Amorphous | 0.97 | 1.4 | 0.06 | 34 |
| Example | 28 | Existed | 45 | 1160 | Amorphous | 0.98 | 1.2 | 0.03 | 35 |
| Example | 29 | Existed | 18 | 1105 | Amorphous | 0.96 | 1.3 | 0.02 | 36 |
| Example | 30 | Existed | 51 | 1050 | Amorphous | 0.98 | 1.3 | 0.05 | 34 |
| Example | 31 | Existed | 55 | 995 | Amorphous | 0.97 | 1.2 | 0.10 | 33 |
| Example | 32 | Existed | 56 | 940 | Amorphous | 0.94 | 1.3 | 0.23 | 31 |
| Example | 33 | Existed | 59 | 885 | Amorphous | 0.87 | 2.3 | 0.68 | 27 |
| Comparative | 34 | | | | | | | | |
| Example | | Existed | 54 | 1200 | Amorphous | 0.95 | 1.4 | 0.03 | 36 |
| Example | 35 | Existed | 52 | 1140 | Amorphous | 0.98 | 1.2 | 0.03 | 37 |
| Example | 36 | Existed | 50 | 1080 | Amorphous | 0.97 | 1.3 | 0.04 | 36 |
| Example | 37 | Existed | 48 | 1020 | Amorphous | 0.97 | 1.3 | 0.08 | 35 |
| Example | 38 | Existed | 47 | 960 | Amorphous | 0.95 | 1.2 | 0.10 | 33 |
| Example | 39 | Existed | 46 | 900 | Amorphous | 0.95 | 1.5 | 0.23 | 31 |
| Example | 40 | Existed | 40 | 840 | Amorphous | 0.83 | 2.8 | 0.58 | 26 |

TABLE 6

| Example/ | | $(Co_{1-\alpha}Fe_{\alpha})_{1-(a+b+c+d+e+f)}M_aB_bP_cSi_dCr_eS_f$ (β = 0) | | | | | | | | | | ΔT = | | | Aver- | Cumu-lative | | Rel-ative |
|---|---|---|---|---|---|---|---|---|---|---|---|---|---|---|---|---|---|---|
| Com-parative Example | Sam-ple No. | Co | Fe | M (Nb) a | B b | P c | Si d | Cr e | S f | Co/B | Tg | Tx − Tg (° C.) | Tm (° C.) | Micro-structure | age circu-larity | number ratio (%) | Hc (Oe) | perme-ability μ |
| Example | 11 | 0.648 | 0.072 | 0.020 | 0.180 | 0.010 | 0.070 | 0.000 | 0.000 | 3.600 | Existed | 41 | 1160 | Amor-phous | 0.98 | 1.2 | 0.02 | 40 |
| Example | 42 | 0.647 | 0.072 | 0.020 | 0.180 | 0.010 | 0.070 | 0.001 | 0.000 | 3.595 | Existed | 40 | 1163 | Amor-phous | 0.98 | 1.2 | 0.02 | 40 |
| Example | 43 | 0.639 | 0.071 | 0.020 | 0.180 | 0.010 | 0.070 | 0.010 | 0.000 | 3.550 | Existed | 38 | 1168 | Amor-phous | 0.96 | 1.3 | 0.04 | 36 |
| Example | 44 | 0.630 | 0.070 | 0.020 | 0.180 | 0.010 | 0.070 | 0.020 | 0.000 | 3.500 | Existed | 37 | 1175 | Amor-phous | 0.98 | 1.3 | 0.14 | 31 |
| Example | 45 | 0.621 | 0.069 | 0.020 | 0.180 | 0.010 | 0.070 | 0.030 | 0.000 | 3.450 | Existed | 38 | 1180 | Amor-phous | 0.98 | 1.3 | 0.14 | 31 |
| Com-parative Example | 46 | 0.620 | 0.069 | 0.020 | 0.180 | 0.010 | 0.070 | 0.031 | 0.000 | 3.445 | Existed | 34 | 1185 | Amor-phous | 0.97 | 2.5 | 0.57 | 28 |

TABLE 7

| Example/ | | $(Co_{1-\alpha}Fe_{\alpha})_{1-(a+b+c+d+e+f)}M_aB_bP_cSi_dCr_eS_f$ (β = 0) | | | | | | | | | | ΔT = | | | Aver- | Cumu-lative | | Rel-ative |
|---|---|---|---|---|---|---|---|---|---|---|---|---|---|---|---|---|---|---|
| Com-parative Example | Sam-ple No. | Co | Fe | M (Nb) a | B b | P c | Si d | Cr e | S f | Co/B | Tg | Tx − Tg (° C.) | Tm (° C.) | Micro-structure | age circu-larity | number ratio (%) | Hc (Oe) | perme-ability μ |
| Example | 11 | 0.648 | 0.072 | 0.020 | 0.180 | 0.010 | 0.070 | 0.000 | 0.000 | 3.600 | Existed | 41 | 1160 | Amor-phous | 0.98 | 1.2 | 0.02 | 40 |
| Example | 47 | 0.644 | 0.072 | 0.020 | 0.180 | 0.010 | 0.070 | 0.000 | 0.005 | 3.575 | Existed | 40 | 1163 | Amor-phous | 0.98 | 1.0 | 0.04 | 38 |
| Example | 48 | 0.639 | 0.071 | 0.020 | 0.180 | 0.010 | 0.070 | 0.000 | 0.010 | 3.550 | Existed | 38 | 1168 | Amor-phous | 0.96 | 0.9 | 0.25 | 31 |
| Com-parative Example | 49 | 0.635 | 0.071 | 0.020 | 0.180 | 0.010 | 0.070 | 0.000 | 0.015 | 3.525 | Existed | 37 | 1175 | Amor-phous | 0.98 | 0.8 | 1.20 | 24 |

In Table 4, experimental examples in which the Co content, Fe content, and M (Nb) content were changed. Sample Nos. 18 to 22 having a composition within a predetermined range had Tg, and Tm within a predetermined range. In addition, the average circularity of the soft magnetic alloy powders was high, the number of deformed particles was small, and the coercivity was low. In addition, the relative permeability of the toroidal cores was high.

In contrast, in Sample No. 17 that did not contain M (Nb), Tg did not exist. As a result, the average circularity of the soft magnetic alloy powder was low, the number of deformed particles was large, and the coercivity was high. In addition, the relative permeability of the toroidal core was high. In addition, in Sample No. 23 in which the M content was excessively large, Tm was excessively low. As a result, the average circularity of the soft magnetic alloy powder was low, the number of deformed particles was large, and the coercivity was high. In addition, the relative permeability of the toroidal core was high.

In Table 5, Sample Nos. 24 to 27 are experimental examples in which the Co content and the Fe content, and the B content (b) were changed from Sample No. 11. Sample Nos. 25 and 26 having a composition within a predetermined range had Tg and Tm within a predetermined range. In addition, the average circularity of the soft magnetic alloy powders was high, the number of deformed particles was small, and the coercivity was low. In addition, the relative permeability of the toroidal cores was high. In contrast, in Sample No. 24 in which the B content was excessively small, the melting point of the soft magnetic alloy was excessively high, and a molten metal could not be injected at the atomization temperature of 1300° C. In Sample No. 27 in which the B content was excessively large, Tm was excessively low. As a result, the number of deformed particles in the soft magnetic alloy powder was large, and the coercivity was high. In addition, the relative permeability of the toroidal core was low.

In Table 5, Sample Nos. 28 to 34 are experimental examples in which the Co content and the Fe content, and the P content were changed from Sample No. 11. Sample Nos. 28 to 33 having a composition within a predetermined range had Tg, and Tm within a predetermined range. In addition, the average circularity of the soft magnetic alloy powders was high, the number of deformed particles was small, and the coercivity was low. In addition, the relative permeability of the toroidal core was high. In contrast, in Sample No. 34 in which the P content was excessively large, Tm was excessively low. As a result, the average circularity of the soft magnetic alloy powder was low, the number of deformed particles was large, and the coercivity was high. In addition, the relative permeability of the toroidal core was low.

In Table 5, Sample Nos. 35 to 41 are experimental examples in which the Co content, the Fe content, and the Si content (d) was changed from Sample No. 11. Sample Nos. 35 to 40 having a composition within a predetermined range had Tg, and Tm within a predetermined range. In addition, the average circularity of the soft magnetic alloy powders was high, the number of deformed particles was small, and the coercivity was low. In addition, the relative permeability of the toroidal cores was high. In contrast, in Sample No. 41 in which the Si content was excessively large, Tm was excessively low. As a result, the average circularity of the soft magnetic alloy powder was low, the number of deformed particles was large, and the coercivity was high. In addition, the relative permeability of the toroidal core was low.

In Table 6, Sample Nos. 42 to 46 are experimental examples in which the Co content, the Fe content, and the Cr content (e) were mainly changed from Sample No. 11. Sample Nos. 42 to 45 having a composition within a predetermined range has Tg, and Tm within a predetermined range. In addition, the average circularity of the soft magnetic alloy powders was high, the number of deformed particles was small, and the coercivity was low. In addition, the relative permeability of the toroidal core was high. In contrast, in Sample No. 46 in which the Cr content was excessively large, the number of deformed particles in the soft magnetic alloy powder was large, and the coercivity was high. In addition, the relative permeability of the toroidal core was low.

In Table 7, Sample Nos. 47 to 49 are experimental examples in which the Co content, the Fe content, and the S content (f) were mainly changed from Sample No. 11. Sample Nos. 47 and 48 having a composition within a predetermined range had Tg, and Tm within a predetermined range. In addition, the average circularity of the soft magnetic alloy powders was high, and the number of deformed particles was small. In contrast, in Sample No. 49 in which the S content was excessively large, the coercivity of the soft magnetic alloy powder was high. In addition, the relative permeability of the toroidal core was low.

Experimental Example 5

In Experimental Example 5, soft magnetic alloy powders and toroidal cores were manufactured under the conditions described in Experimental Example 1 except that a part of Co was substituted with X1 and/or X2 with respect to Sample No. 8. Results are shown in Table 8 and Table 9.

TABLE 8

| Example/ Com- parative Example | Sam- ple No. | Micro- structure | $(Co_{(1-(\alpha+\beta))}X1_{\alpha}X2_{\beta})_{0.720}Nb_{0.020}B_{0.180}P_{0.010}Si_{0.070}$ X1 Kind | $\alpha \times 0.720$ | X2 Kind | $\beta \times 0.720$ | Tg | ΔT = Tx − Tg (° C.) | Tm (° C.) | Aver- age circu- larity | Cum- ulative number ratio (%) | Hc (Oe) | Relative perme- ability μ |
|---|---|---|---|---|---|---|---|---|---|---|---|---|---|
| Example | 8 | Amorphous | — | 0.000 | — | 0.000 | Existed | 40 | 1150 | 0.97 | 1.4 | 0.03 | 38 |
| Example | 50 | Amorphous | Ni | 0.050 | — | 0.000 | Existed | 38 | 1148 | 0.96 | 1.4 | 0.07 | 36 |
| Example | 51 | Amorphous | Ni | 0.100 | — | 0.000 | Existed | 32 | 1145 | 0.95 | 1.4 | 0.07 | 35 |
| Example | 53 | Amorphous | — | 0.000 | Al | 0.001 | Existed | 39 | 1150 | 0.96 | 1.4 | 0.05 | 36 |
| Example | 54 | Amorphous | — | 0.000 | Al | 0.005 | Existed | 37 | 1147 | 0.97 | 1.4 | 0.06 | 35 |
| Example | 55 | Amorphous | — | 0.000 | Al | 0.010 | Existed | 33 | 1143 | 0.97 | 1.4 | 0.06 | 36 |
| Example | 56 | Amorphous | — | 0.000 | Al | 0.030 | Existed | 29 | 1140 | 0.95 | 1.3 | 0.06 | 35 |
| Example | 57 | Amorphous | — | 0.000 | Zn | 0.001 | Existed | 39 | 1147 | 0.96 | 1.4 | 0.05 | 35 |
| Example | 58 | Amorphous | — | 0.000 | Zn | 0.005 | Existed | 38 | 1143 | 0.96 | 1.5 | 0.04 | 35 |

TABLE 8-continued

| Example/ Comparative Example | Sample No. | Microstructure | $(Co_{(1-(\alpha+\beta))}X1_{\alpha}X2_{\beta})_{0.720}Nb_{0.020}B_{0.180}P_{0.010}Si_{0.070}$ X1 Kind | $\alpha \times 0.720$ | X2 Kind | $\beta \times 0.720$ | Tg | ΔT = Tx − Tg (° C.) | Tm (° C.) | Average circularity | Cumulative number ratio (%) | Hc (Oe) | Relative permeability μ |
|---|---|---|---|---|---|---|---|---|---|---|---|---|---|
| Example | 59 | Amorphous | — | 0.000 | Zn | 0.010 | Existed | 36 | 1140 | 0.97 | 1.4 | 0.07 | 35 |
| Example | 60 | Amorphous | — | 0.000 | Zn | 0.030 | Existed | 34 | 1135 | 0.95 | 1.4 | 0.05 | 35 |
| Example | 61 | Amorphous | — | 0.000 | Sn | 0.001 | Existed | 38 | 1145 | 0.96 | 1.5 | 0.07 | 35 |
| Example | 62 | Amorphous | — | 0.000 | Sn | 0.005 | Existed | 35 | 1140 | 0.95 | 1.5 | 0.07 | 35 |
| Example | 63 | Amorphous | — | 0.000 | Sn | 0.010 | Existed | 32 | 1135 | 0.97 | 1.4 | 0.03 | 36 |
| Example | 64 | Amorphous | — | 0.000 | Sn | 0.030 | Existed | 27 | 1128 | 0.96 | 1.5 | 0.05 | 35 |
| Example | 65 | Amorphous | — | 0.000 | Cu | 0.001 | Existed | 40 | 1150 | 0.96 | 1.3 | 0.04 | 36 |
| Example | 66 | Amorphous | — | 0.000 | Cu | 0.005 | Existed | 39 | 1150 | 0.95 | 1.5 | 0.04 | 36 |
| Example | 67 | Amorphous | — | 0.000 | Cu | 0.010 | Existed | 37 | 1150 | 0.97 | 1.4 | 0.08 | 36 |
| Example | 68 | Amorphous | — | 0.000 | Cu | 0.030 | Existed | 35 | 1150 | 0.95 | 1.4 | 0.04 | 36 |
| Example | 69 | Amorphous | — | 0.000 | Bi | 0.001 | Existed | 38 | 1145 | 0.97 | 1.4 | 0.03 | 35 |
| Example | 70 | Amorphous | — | 0.000 | Bi | 0.005 | Existed | 36 | 1140 | 0.96 | 1.5 | 0.03 | 36 |
| Example | 71 | Amorphous | — | 0.000 | Bi | 0.010 | Existed | 34 | 1135 | 0.96 | 1.4 | 0.04 | 36 |
| Example | 72 | Amorphous | — | 0.000 | Bi | 0.030 | Existed | 32 | 1130 | 0.95 | 1.4 | 0.04 | 35 |

TABLE 9

| Example/ Comparative Example | Sample No. | Microstructure | $(Co_{(1-(\alpha+\beta))}X1_{\alpha}X2_{\beta})_{0.720}Nb_{0.020}B_{0.180}P_{0.010}Si_{0.070}$ X1 Kind | $\alpha \times 0.720$ | X2 Kind | $\beta \times 0.720$ | Tg | ΔT = Tx − Tg (° C.) | Tm (° C.) | Average circularity | Cumulative number ratio (%) | Hc (Oe) | Relative permeability μ |
|---|---|---|---|---|---|---|---|---|---|---|---|---|---|
| Example | 73 | Amorphous | — | 0.000 | La | 0.001 | Existed | 40 | 1150 | 0.97 | 1.3 | 0.09 | 35 |
| Example | 74 | Amorphous | — | 0.000 | La | 0.005 | Existed | 42 | 1145 | 0.97 | 1.4 | 0.08 | 35 |
| Example | 75 | Amorphous | — | 0.000 | La | 0.010 | Existed | 44 | 1140 | 0.97 | 1.4 | 0.10 | 35 |
| Example | 76 | Amorphous | — | 0.000 | La | 0.030 | Existed | 46 | 1130 | 0.95 | 1.4 | 0.09 | 34 |
| Example | 77 | Amorphous | — | 0.000 | Y | 0.001 | Existed | 40 | 1150 | 0.96 | 1.4 | 0.09 | 35 |
| Example | 78 | Amorphous | — | 0.000 | Y | 0.005 | Existed | 41 | 1148 | 0.96 | 1.5 | 0.08 | 35 |
| Example | 79 | Amorphous | — | 0.000 | Y | 0.010 | Existed | 42 | 1145 | 0.95 | 1.5 | 0.09 | 35 |
| Example | 80 | Amorphous | — | 0.000 | Y | 0.030 | Existed | 44 | 1140 | 0.96 | 1.4 | 0.07 | 35 |
| Example | 81 | Amorphous | — | 0.000 | N | 0.001 | Existed | 40 | 1150 | 0.95 | 1.5 | 0.09 | 35 |
| Example | 82 | Amorphous | — | 0.000 | O | 0.001 | Existed | 40 | 1150 | 0.96 | 1.3 | 0.07 | 35 |
| Example | 83 | Amorphous | — | 0.000 | C | 0.001 | Existed | 35 | 1145 | 0.96 | 1.3 | 0.07 | 35 |
| Example | 84 | Amorphous | — | 0.000 | S | 0.001 | Existed | 38 | 1145 | 0.96 | 1.4 | 0.08 | 34 |
| Example | 85 | Amorphous | Fe | 0.100 | Al | 0.050 | Existed | 29 | 1150 | 0.96 | 1.4 | 0.09 | 34 |
| Example | 86 | Amorphous | Fe | 0.100 | Zn | 0.050 | Existed | 27 | 1140 | 0.95 | 1.3 | 0.09 | 32 |
| Example | 87 | Amorphous | Fe | 0.100 | Sn | 0.050 | Existed | 28 | 1130 | 0.97 | 1.4 | 0.07 | 32 |
| Example | 88 | Amorphous | Fe | 0.100 | Cu | 0.050 | Existed | 35 | 1165 | 0.96 | 1.4 | 0.08 | 34 |
| Example | 89 | Amorphous | Fe | 0.100 | Bi | 0.050 | Existed | 33 | 1131 | 0.95 | 1.4 | 0.09 | 33 |
| Example | 90 | Amorphous | Fe | 0.100 | La | 0.050 | Existed | 38 | 1160 | 0.96 | 1.4 | 0.07 | 33 |
| Example | 91 | Amorphous | Fe | 0.100 | Y | 0.050 | Existed | 39 | 1155 | 0.96 | 1.3 | 0.09 | 34 |
| Example | 92 | Amorphous | Ni | 0.100 | Al | 0.050 | Existed | 29 | 1130 | 0.96 | 1.4 | 0.09 | 36 |
| Example | 93 | Amorphous | Ni | 0.100 | Zn | 0.050 | Existed | 27 | 1120 | 0.95 | 1.5 | 0.09 | 36 |
| Example | 94 | Amorphous | Ni | 0.100 | Sn | 0.050 | Existed | 28 | 1100 | 0.95 | 1.3 | 0.10 | 35 |
| Example | 95 | Amorphous | Ni | 0.100 | Cu | 0.050 | Existed | 35 | 1145 | 0.96 | 1.4 | 0.07 | 36 |
| Example | 96 | Amorphous | Ni | 0.100 | Bi | 0.050 | Existed | 33 | 1110 | 0.96 | 1.5 | 0.07 | 35 |
| Example | 97 | Amorphous | Ni | 0.100 | La | 0.050 | Existed | 38 | 1140 | 0.97 | 1.3 | 0.08 | 35 |
| Example | 98 | Amorphous | Ni | 0.100 | Y | 0.050 | Existed | 39 | 1135 | 0.95 | 1.4 | 0.08 | 36 |

Even when substituting a part of Co with X1 and/or X2, each sample having a composition within a predetermined range had Tg, and Tm within a predetermined range. In addition, the average circularity of the soft magnetic alloy powders was high, the number of deformed particles was small, and the coercivity was low. In addition, the relative permeability of the toroidal cores was high.

Experimental Example 6

In Experimental Example 6, soft magnetic alloy powders and toroidal cores were manufactured under the conditions described in Experimental Example 1 except that the kind of M was changed with respect to Sample No. 8. Results are shown in Table 10.

TABLE 10

| Example/ Comparative Example | Sample No. | Micro-structure | $Co_{0.720}M_{0.020}B_{0.180}P_{0.010}Si_{0.070}$ M Kind | a | Tg | ΔT = Tx − Tg (° C.) | Tm (° C.) | Average circularity | Cumulative number ratio (%) | Hc (Oe) | Relative permeability μ |
|---|---|---|---|---|---|---|---|---|---|---|---|
| Example | 8 | Amorphous | Nb | 0.020 | Existed | 40 | 1150 | 0.97 | 1.4 | 0.03 | 38 |
| Example | 99 | Amorphous | Hf | 0.020 | Existed | 42 | 1151 | 0.96 | 1.3 | 0.03 | 37 |
| Example | 100 | Amorphous | Zr | 0.020 | Existed | 42 | 1151 | 0.95 | 1.4 | 0.02 | 37 |
| Example | 101 | Amorphous | Ta | 0.020 | Existed | 39 | 1151 | 0.98 | 1.4 | 0.03 | 38 |
| Example | 102 | Amorphous | Mo | 0.020 | Existed | 38 | 1150 | 0.97 | 1.4 | 0.03 | 37 |
| Example | 103 | Amorphous | W | 0.020 | Existed | 35 | 1146 | 0.98 | 1.3 | 0.03 | 38 |
| Example | 104 | Amorphous | V | 0.020 | Existed | 30 | 1148 | 0.96 | 1.4 | 0.03 | 37 |
| Example | 105 | Amorphous | Ti | 0.020 | Existed | 27 | 1154 | 0.96 | 1.5 | 0.03 | 38 |
| Example | 106 | Amorphous | $Nb_{0.5}Hf_{0.5}$ | 0.020 | Existed | 40 | 1150 | 0.98 | 1.4 | 0.04 | 37 |
| Example | 107 | Amorphous | $Zr_{0.5}Ta_{0.5}$ | 0.020 | Existed | 41 | 1150 | 0.98 | 1.4 | 0.03 | 38 |
| Example | 108 | Amorphous | $Nb_{0.4}Hf_{0.3}Zr_{0.3}$ | 0.020 | Existed | 44 | 1150 | 0.96 | 1.4 | 0.04 | 38 |

Even when changing the kind of M, each sample having a composition within a predetermined range had Tg, and Tm within a predetermined range. In addition, the average circularity of the soft magnetic alloy powders was high, the number of deformed particles was small, and the coercivity was low. In addition, the relative permeability of the toroidal cores was high.

Experimental Example 7

In Experimental Example 7, soft magnetic alloy powders and toroidal cores were manufactured under the conditions described in Experimental Example 1 except that heat treatment conditions were changed with respect to Sample No. 8. Specifically, a heat treatment was not performed in Sample No. 109. In Sample No. 110, a heat treatment temperature was raised to 575° C. Results are shown in Table 11. Note that, although not shown in Table 11, each sample had Tg, and Tm within a predetermined range. In addition, the average circularity of the soft magnetic alloy powders was high, the number of deformed particles was small, and the coercivity was low.

TABLE 11

| Example/ Comparative Example | Sample No. | Microstructure | Heat treatment temperature (° C.) | Relative permeability μ |
|---|---|---|---|---|
| Example | 109 | Amorphous | None | 31 |
| Example | 8 | Amorphous | 475 | 38 |
| Example | 110 | Amorphous + nanocrystal | 575 | 34 |

It could be said that the soft magnetic alloy powder of Sample No. 109 was a soft magnetic alloy powder before the heat treatment in a process of manufacturing the soft magnetic alloy powder of Sample No. 8. When comparing before and after the heat treatment at 475° C., since crystals were not generated at the heat treatment, and distortion or stress could be removed, it was considered that the relative permeability p was raised.

The soft magnetic alloy powder of Sample No. 110 was subjected to the heat treatment at 575° C., nanocrystals were generated.

Experimental Example 8

In Experimental Example 8, soft magnetic alloy powders and toroidal cores of Sample Nos. 111 and 112 were manufactured under the conditions described in Experimental Example 3 except that an average particle size on the volume basis was changed from Sample No. 11. In addition, soft magnetic alloy powders and toroidal cores of Sample Nos. 113 to 115 were manufactured under the same conditions as in Sample Nos. 11, 111, and 112 except that the B content (b) was lowered and the atomization temperature was set to 1600° C. Results are shown in Table 12.

TABLE 12

| Example/ Comparative Example | Sample No. | Micro-structure | $Co_{0.828-b}Fe_{0.072}Nb_{0.020}B_bP_{0.010}Si_{0.070}$ B b | Tg | ΔT = Tx − Tg (° C.) | Tm (° C.) | Volume-basis average particle size (μm) | Average circularity | Cumulative number ratio (%) | Hc (Oe) | Relative permeability μ |
|---|---|---|---|---|---|---|---|---|---|---|---|
| Example | 111 | Amorphous | 0.180 | Existed | 41 | 1160 | 5 | 0.97 | 1.2 | 0.03 | 31 |
| Example | 11 | Amorphous | 0.180 | Existed | 41 | 1160 | 25 | 0.98 | 1.2 | 0.02 | 40 |
| Example | 112 | Amorphous | 0.180 | Existed | 41 | 1160 | 50 | 0.97 | 1.4 | 0.02 | 45 |
| Comparative Example | 113 | Amorphous | 0.160 | None | — | 1210 | 5 | 0.92 | 2.1 | 1.34 | 20 |
| Comparative Example | 114 | Amorphous | 0.160 | None | — | 1210 | 25 | 0.92 | 2.2 | 1.24 | 23 |

TABLE 12-continued

| Example/ Comparative Example | Sample No. | Microstructure | $Co_{0.828-b}Fe_{0.072}Nb_{0.020}B_bP_{0.010}Si_{0.070}$ B b | Tg | ΔT = Tx − Tg (° C.) | Tm (° C.) | Volume-basis average particle size (μm) | Average circularity | Cumulative number ratio (%) | Hc (Oe) | Relative permeability μ |
|---|---|---|---|---|---|---|---|---|---|---|---|
| Comparative Example | 115 | Amorphous | 0.160 | None | — | 1210 | 50 | 0.92 | 2.4 | 1.23 | 29 |

As can be seen from Table 12, the larger the average particle size was, the further the relative permeability of the toroidal cores was raised. In addition, respective samples of Sample Nos. 11, 111, and 112 having a composition within a predetermined range had Tg, and Tm within a predetermined range. In addition, the average circularity of the soft magnetic alloy powders was high, the number of deformed particles was small, and the coercivity was low. In addition, the relative permeability of the toroidal cores was high.

In contrast, respective samples of Sample Nos. 113 to 115 in which the B content (b) was excessively small did not have Tg, and Tm was excessively high. As a result, the average circularity of the soft magnetic alloy powders was low, the number of deformed particles was large, and the coercivity was high. In addition, the relative permeability of the toroidal core was low.

Experimental Example 9

Ingots of various materials were prepared and weighed to obtain a mother alloy having a composition of $Co_{0.720}Nb_{0.020}B_{0.180}P_{0.010}Si_{0.070}$. In addition, the weighed ingots were stored in a crucible disposed in the gas atomization device.

Next, the mother alloy was stored in the heat-resistant container 22 disposed inside the atomization device 10. Next, the inside of the cylindrical body 32 was evacuated, the heat-resistant container 22 was heated by high-frequency induction by using a heating coil 24 provided at the outside of the heat-resistant container 22 to melt and mix raw material metals inside the heat-resistant container 22, thereby obtaining a molten metal.

The obtained molten metal was injected to the inside of a cylindrical body 32 of the cooling unit 30 at the atomization temperature of 1500° C., and an argon gas was injected at an injection gas pressure of 7 MPa, thereby forming a plurality of droplets. The droplets collided with a cooling water flow formed in an inverted conical shape by cooling water supplied at a pump pressure of 10 MPa, and the droplets were converted into fine powders and were collected.

Note that, in the atomization device 10 shown in FIG. 10A and FIG. 10B, an inner diameter of the inner surface of the cylindrical body 32 was 300 mm, and the angle θ1 was 20°. In addition, in Experimental Example 9, D1/D2 was set to conditions shown in Table 13.

It was confirmed that the composition of the mother alloy and the composition of the soft magnetic alloy powder approximately match each other by ICP analysis.

It was confirmed that each of obtained soft magnetic alloy powders had a structure composed of the amorphous material, a structure composed of the nanocrystal material, or a structure composed of the crystal material. Presence and absence of a peak derived from nanocrystals were confirmed by using XRD. A case where the amorphization rate X is 85% or more was assumed as the structure composed of the amorphous material, a case where the amorphization rate X is less than 85% was assumed as the structure composed of the nanocrystal material or the crystal material. In addition, with regard to a case where the amorphization rate is 85% or more, it was confirmed that the structure composed of the amorphous material was a structure including only the amorphous material, or a structure composed of the hetero amorphous material by using TEM. As a result of the confirmation with TEM, the structure including only the amorphous material was described as "amorphous", and the structure composed of the hetero amorphous material was described as "hetero amorphous". Note that, with regard to a case where the amorphization rate was less than 85%, it was confirmed whether or not to include crystals greater than nanocrystals through evaluation on a crystallite size by using Scherrer formula in XRD. In a case where crystals greater than nanocrystals were not included, it was assumed to have the structure composed of the nanocrystal material. In addition, in the case of having the structure composed of the nanocrystal material, it is described as "nanocrystal", and in a case where crystals greater than nanocrystals are included, it is described as "crystal". Results are shown in a microstructure column in Table 13.

Next, 2 g of the obtained soft magnetic alloy powder was weighed. Next, the weighed powder was put into a mold having ϕ of 8 mm. Next, the powder put into the mold was compressed at a specific pressure $X_P$ for 30 seconds by a hand press. Next, the compressed powder was taken out from the mold, thereby obtaining the compressed powder.

In measurement of k, in respective samples, three kinds of powders including a powder that was not compressed ($X_P$=0), a powder in which the pressure $X_P$ at the time of compression was set to 400 MPa, a powder in which the pressure $X_P$ at the time of compression was set to 800 MPa were prepared, and the coercivity (unit: Oe) of the respective powders was measured by using He meter (K-HC1000 type (manufactured by TOHOKU STEEL Co., Ltd.)). In addition, in a state in which coercivity when applying the pressure $X_P$ was set as $Y_H$, and a straight line obtained by linearly approximating a relationship between $X_P$ and $Y_H$ by a method of least squares was set as $Y_H$=k$X_P$+1, k that is a slope of the approximated straight line was calculated. Results are shown in Table 13.

Next, a toroidal core was manufactured from each of the soft magnetic alloy powders. Specifically, a phenol resin as an insulating binder was mixed to the soft magnetic alloy powder in a content of 3% or less with respect to the entirety, and the resultant mixture was granulated to a granulated powder having a size of approximately 500 μm by using a typical planetary mixer as a stirrer. Next, the obtained granulated powder was molded at a surface pressure of 6 ton/cm² (588 MPa) to a surface pressure of 8 ton/cm² (784 MPa) so that a packing rate of a magnetic substance becomes 70% to 72%, thereby preparing a green compact in a toroidal shape having an outer diameter of 13 mmϕ, an inner diameter of 8 mmϕ, and a height of 6 mm. The obtained green compact was cured at 150° C. to prepare a toroidal core.

In addition, the coercivity of the toroidal core was measured by using He meter (K-HC1000 type (manufactured by TOHOKU STEEL Co., Ltd.)). With regard to the coercivity of the toroidal core, 1.00 Oe or less was evaluated as satisfactory, 0.50 Oe or less was evaluated as very satisfactory, and 0.30 Oe or less was evaluated as particularly satisfactory.

In addition, A UEW wire was wound around the toroidal core, and p (relative permeability) was measured at 100 kHz by using 4284A PRECISION LCR METER (manufactured by HP Development Company, L.P.). Results are shown in Table 13. Note that, with regard to the relative permeability μ, the case of 30 or more was determined as satisfactory, and the case of 35 or more was determined as very satisfactory.

As can be seen from Table 14, in Sample Nos. 201, and 205 to 209 in which k satisfied 0≤k≤0.00100, both the coercivity of the core and the relative permeability of the core were satisfactory. Particularly, in Sample Nos. 201, and 205 to 208 in which a microstructure was a structure including only an amorphous material, a structure composed of the hetero amorphous material, or a structure composed of the nanocrystal material, both the coercivity of the core and the relative permeability of the core were more satisfactory in comparison to Sample No. 209 in which the microstructure is a structure including crystals greater than nanocrystal. In addition, in Sample Nos. 201, and 205 to 207 in which the microstructure was the structure including only an amorphous material or the structure composed of the hetero amorphous material, both the coercivity of the core and the relative permeability of the core were more satisfactory in comparison to Sample No. 208 in which the microstructure was the structure composed of the nanocrystal material. In contrast, in Sample No. 210, k was excessively large, the coercivity of the core was excessively high,

TABLE 13

| Sample No. | Example/ Comparative Example | D1/ D2 | Heat treatment temperature (° C.) | Micro-structure | $Y_H$ $X_p = 0$ | $X_p = 400$ | $X_p = 800$ | k (Oe/ MPa) | Coercivity of core (Oe) | Relative permeability of core |
|---|---|---|---|---|---|---|---|---|---|---|
| 201 | Example | 1/10 | Without heat treatment | Amorphous | 0.03 | 0.16 | 0.32 | 0.00037 | 0.24 | 36 |
| 202 | Example | 1/2 | Without heat treatment | Amorphous | 0.07 | 0.30 | 0.48 | 0.00051 | 0.38 | 33 |
| 203 | Example | 2/3 | Without heat treatment | Amorphous | 0.18 | 0.51 | 0.82 | 0.00080 | 0.57 | 32 |
| 204 | Comparative Example | 1 | Without heat treatment | Amorphous | 0.56 | 1.03 | 1.52 | 0.00113 | 1.11 | 28 |

As can be seen from Table 13, in Sample Nos. 201 to 203 in which k satisfied 0≤k≤0.00100, both the coercivity of the core and the relative permeability of the core were satisfactory. In contrast, in Sample No. 204 in which D1/D2 was set to 1, k was excessively large, the coercivity of the core was excessively high, and the relative permeability of the core was excessively low.

Experimental Example 10

In Experimental Example 10, soft magnetic alloy powders and toroidal cores were manufactured under the same conditions as in Sample No. 201 or Sample No. 204 except that the heat treatment was performed for 60 minutes at a temperature shown in Table 14 with respect to Sample No. 201 or Sample No. 204. Results are shown in Table 14.

and the relative permeability of the core was excessively low. In addition, in Sample No. 204, and Sample Nos. 211 to 216 obtained by performing the heat treatment with respect to Sample No. 204, k was excessively large without depending on the microstructure, the coercivity of the core was excessively high, and the relative permeability of the core was excessively low.

Experimental Example 11

In Experimental Example 11, soft magnetic alloy powders and toroidal core were manufactured under the same conditions as in Sample No. 207 except that a part or the entirety of Co was substituted with Fe with respect to Sample No. 207. Results are shown in Table 15. Note that, with regard to a microstructure of the soft magnetic powders, it was

TABLE 14

| Sample No. | Example/ Comparative Example | D1/ D2 | Heat treatment temperature (° C.) | Microstructure | $Y_H$ $X_p = 0$ | $X_p = 400$ | $X_p = 800$ | k (Oe/ MPa) | Coercivity of core (Oe) | Relative permeability of core |
|---|---|---|---|---|---|---|---|---|---|---|
| 201 | Example | 1/10 | Without heat treatment | Amorphous | 0.03 | 0.16 | 0.32 | 0.00037 | 0.24 | 36 |
| 205 | Example | 1/10 | 250 | Amorphous | 0.03 | 0.16 | 0.31 | 0.00035 | 0.23 | 36 |
| 206 | Example | 1/10 | 350 | Amorphous | 0.03 | 0.14 | 0.27 | 0.00030 | 0.20 | 37 |
| 207 | Example | 1/10 | 450 | Hetero amorphous | 0.02 | 0.10 | 0.19 | 0.00021 | 0.17 | 38 |
| 208 | Example | 1/10 | 550 | nanocrystal | 0.06 | 0.28 | 0.47 | 0.00051 | 0.32 | 33 |
| 209 | Example | 1/10 | 600 | Crystal | 0.38 | 0.83 | 1.14 | 0.00095 | 0.91 | 30 |
| 210 | Comparative Example | 1/10 | 650 | Crystal | 0.56 | 1.03 | 1.79 | 0.00154 | 1.45 | 28 |
| 204 | Comparative Example | 1 | Without heat treatment | Amorphous | 0.56 | 1.03 | 1.52 | 0.00113 | 1.11 | 28 |
| 211 | Comparative Example | 1 | 250 | Amorphous | 0.56 | 1.03 | 1.53 | 0.00121 | 1.10 | 28 |
| 212 | Comparative Example | 1 | 350 | Amorphous | 0.57 | 1.04 | 1.57 | 0.00125 | 1.11 | 28 |
| 213 | Comparative Example | 1 | 450 | Hetero amorphous | 0.58 | 1.09 | 1.64 | 0.00133 | 1.16 | 28 |
| 214 | Comparative Example | 1 | 550 | nanocrystal | 0.62 | 1.16 | 1.76 | 0.00143 | 1.23 | 27 |
| 215 | Comparative Example | 1 | 600 | Crystal | 1.02 | 1.89 | 2.67 | 0.00206 | 1.96 | 25 |
| 216 | Comparative Example | 1 | 650 | Crystal | 1.85 | 3.05 | 4.22 | 0.00296 | 3.12 | 22 |

confirmed only that the amorphization rate was 85% or greater by XRD. That is, the structure composed of the amorphous material was confirmed, but it was not confirmed whether the structure composed of the amorphous material was the structure including only the amorphous material, or the structure composed of the hetero amorphous material.

As can be seen from Table 16, in Sample Nos. 217, and 225 to 229 satisfying relationships of $0.001 \le a \le 0.140$, $0.500 < 1-(a+b+c+d+e) < 0.840$, and $0 \le k \le 0.00100$, the coercivity of the cores and the relative permeability of the cores were satisfactory. In contrast, in Sample No. 224 which did not contain M (Nb) and a was 0.000, the coercivity of the core was excessively high, and the relative permeability of the core was excessively low. In addition, in Sample No. 230 in which a was excessively large, k was excessively large, the coercivity of the core was excessively high, and the relative permeability of the core was excessively low. Note that, samples other than Sample No. 224 had a structure composed of the amorphous material. Sample No. 224 included crystals greater than nanocrystals.

TABLE 15

| Sample No. | Example/ Comparative Example | $(Co_{1-\alpha}Fe_{\alpha})_{0.720}Nb_{0.020}B_{0.180}P_{0.010}Si_{0.070}$ Co content | Fe content | $\alpha + \beta$ ($\beta$ = 0) | $Y_H$ $X_p$ = 0 | $X_p$ = 400 | $X_p$ = 800 | k (Oe/MPa) | Coercivity of core (Oe) | Relative permeability of core |
|---|---|---|---|---|---|---|---|---|---|---|
| 207 | Example | 0.720 | 0.000 | 0.000 | 0.02 | 0.10 | 0.19 | 0.00021 | 0.17 | 38 |
| 217 | Example | 0.648 | 0.072 | 0.100 | 0.02 | 0.07 | 0.14 | 0.00015 | 0.14 | 40 |
| 218 | Example | 0.576 | 0.144 | 0.200 | 0.03 | 0.15 | 0.28 | 0.00031 | 0.22 | 37 |
| 219 | Example | 0.504 | 0.216 | 0.300 | 0.07 | 0.21 | 0.37 | 0.00037 | 0.29 | 36 |
| 220 | Example | 0.432 | 0.288 | 0.400 | 0.15 | 0.34 | 0.58 | 0.00054 | 0.43 | 33 |
| 222 | Comparative Example | 0.288 | 0.432 | 0.600 | 0.33 | 0.90 | 1.67 | 0.00168 | 1.02 | 27 |
| 223 | Comparative Example | 0.000 | 0.720 | 1.000 | 1.20 | 2.20 | 3.90 | 0.00338 | 2.45 | 23 |

As can be seen from Table 15, in Sample Nos. 207, and 217 to 220 in which a+P was within a specific range, and $0 \le k \le 0.00100$ was satisfied, the relative permeability of the core was satisfactory. In contrast, in Sample Nos. 222 and 223 in which $\alpha+\beta$ was excessively large, and k was excessively large, the coercivity of the core was excessively high, and the relative permeability of the core was excessively low. In addition, particularly, in Sample No. 217 in which Co/Fe was 5 to 20 in the atom number ratio, k was smaller, the coercivity of the core was lower, and the relative permeability of the core was higher in comparison to Sample Nos. 207, and 218 to 220 in which Co/Fe was out of the above-described range. Note that, all samples in Table 15 had the structure composed of the amorphous material.

Experimental Example 12

In Experimental Example 12, soft magnetic alloy powders and toroidal cores were manufactured under the same conditions as in Sample No. 217 except that the Nb content (a) was changed and the Co content and the Fe content were changed from Sample No. 217. Results are shown in Table 16. Note that, with regard to a microstructure of the soft magnetic powder, it was not confirmed whether the structure composed of the amorphous material was the structure including only the amorphous material or the structure composed of the hetero amorphous material.

Experimental Example 13

In Experimental Example 13, soft magnetic alloy powders and toroidal cores were manufactured under the same conditions as in Sample No. 217 except that the B content (b), the P content (c), the Si content (d), the Cr content (e), the Co content and the Fe content were changed from were changed from Sample No. 217. Results are shown in Table 17. Note that, with regard to a microstructure of the soft magnetic powders, it was not confirmed whether the structure composed of the amorphous material was the structure including only the amorphous material, or the structure composed of the hetero amorphous material.

TABLE 16

| Sample No. | Example/ Comparative Example | $(Co_{0.900}Fe_{0.100})_{1-(a+0.260)}Nb_aB_{0.180}P_{0.010}Si_{0.070}$ Co content | Fe content | Nb a | 1 − (a + b + c + d + e) (b + c + d + e = 0.260) | $Y_H$ $X_p$ = 0 | $X_p$ = 400 | $X_p$ = 800 | k (Oe/MPa) | Coercivity of core (Oe) | Relative permeability of core |
|---|---|---|---|---|---|---|---|---|---|---|---|
| 224 | Comparative Example | 0.666 | 0.074 | 0.000 | 0.740 | 1.22 | 1.54 | 1.95 | 0.00091 | 1.67 | 24 |
| 225 | Example | 0.665 | 0.074 | 0.001 | 0.739 | 0.23 | 0.51 | 0.81 | 0.00073 | 0.57 | 32 |
| 226 | Example | 0.663 | 0.074 | 0.003 | 0.737 | 0.11 | 0.32 | 0.44 | 0.00041 | 0.39 | 35 |
| 217 | Example | 0.648 | 0.072 | 0.020 | 0.720 | 0.02 | 0.07 | 0.14 | 0.00015 | 0.14 | 40 |
| 227 | Example | 0.630 | 0.070 | 0.040 | 0.700 | 0.03 | 0.11 | 0.21 | 0.00023 | 0.19 | 38 |
| 228 | Example | 0.576 | 0.064 | 0.100 | 0.640 | 0.06 | 0.23 | 0.41 | 0.00044 | 0.31 | 34 |
| 229 | Example | 0.540 | 0.060 | 0.140 | 0.600 | 0.17 | 0.44 | 0.77 | 0.00075 | 0.53 | 32 |
| 230 | Comparative Example | 0.531 | 0.059 | 0.150 | 0.590 | 0.53 | 1.17 | 1.81 | 0.00160 | 1.28 | 28 |

TABLE 17

| Sample No. | Example/Comparative Example | $(Co_{0.900}Fe_{0.100})_{1-(a+b+c+d)}Nb_{0.020}B_bP_cSi_dCr_e$ Co content | Fe content | B b | P c | Si d | Cr e | b + c + d + e | 1 − (a + b + c + d + e) (a = 0.020) | $Y_H$ $X_p$ = 0 | $X_p$ = 400 | $X_p$ = 800 | k (Oe/MPa) | Coercivity of core (Oe) | Relative permeability of core |
|---|---|---|---|---|---|---|---|---|---|---|---|---|---|---|---|
| 231 | Comparative Example | 0.666 | 0.074 | 0.160 | 0.010 | 0.070 | 0.000 | 0.240 | 0.740 | 0.97 | 1.58 | 2.37 | 0.00175 | 1.68 | 27 |
| 217 | Example | 0.648 | 0.072 | 0.180 | 0.010 | 0.070 | 0.000 | 0.260 | 0.720 | 0.02 | 0.07 | 0.14 | 0.00015 | 0.14 | 40 |
| 232 | Example | 0.612 | 0.068 | 0.220 | 0.010 | 0.070 | 0.000 | 0.300 | 0.680 | 0.03 | 0.16 | 0.32 | 0.00036 | 0.23 | 36 |
| 233 | Example | 0.585 | 0.065 | 0.250 | 0.010 | 0.070 | 0.000 | 0.330 | 0.650 | 0.18 | 0.41 | 0.76 | 0.00073 | 0.47 | 32 |
| 234 | Comparative Example | 0.576 | 0.064 | 0.260 | 0.010 | 0.070 | 0.000 | 0.340 | 0.640 | 0.44 | 0.98 | 1.67 | 0.00154 | 1.08 | 28 |
| 235 | Example | 0.657 | 0.073 | 0.180 | 0.000 | 0.070 | 0.000 | 0.250 | 0.730 | 0.03 | 0.10 | 0.20 | 0.00022 | 0.18 | 38 |
| 217 | Example | 0.648 | 0.072 | 0.180 | 0.010 | 0.070 | 0.000 | 0.260 | 0.720 | 0.02 | 0.07 | 0.14 | 0.00015 | 0.14 | 40 |
| 236 | Example | 0.630 | 0.070 | 0.180 | 0.030 | 0.070 | 0.000 | 0.280 | 0.700 | 0.04 | 0.15 | 0.27 | 0.00029 | 0.23 | 37 |
| 237 | Example | 0.612 | 0.068 | 0.180 | 0.050 | 0.070 | 0.000 | 0.300 | 0.680 | 0.04 | 0.20 | 0.38 | 0.00042 | 0.26 | 35 |
| 238 | Example | 0.567 | 0.063 | 0.180 | 0.100 | 0.070 | 0.000 | 0.350 | 0.630 | 0.07 | 0.25 | 0.48 | 0.00051 | 0.33 | 33 |
| 239 | Example | 0.522 | 0.058 | 0.180 | 0.150 | 0.070 | 0.000 | 0.400 | 0.580 | 0.16 | 0.41 | 0.71 | 0.00069 | 0.49 | 32 |
| 240 | Example | 0.522 | 0.058 | 0.180 | 0.200 | 0.020 | 0.000 | 0.400 | 0.580 | 0.27 | 0.61 | 0.98 | 0.00089 | 0.68 | 31 |
| 241 | Comparative Example | 0.522 | 0.058 | 0.180 | 0.210 | 0.010 | 0.000 | 0.400 | 0.580 | 0.58 | 1.17 | 1.84 | 0.00158 | 1.29 | 28 |
| 242 | Example | 0.720 | 0.080 | 0.180 | 0.000 | 0.000 | 0.000 | 0.180 | 0.800 | 0.08 | 0.21 | 0.37 | 0.00036 | 0.28 | 36 |
| 243 | Example | 0.675 | 0.075 | 0.180 | 0.000 | 0.050 | 0.000 | 0.230 | 0.750 | 0.06 | 0.16 | 0.29 | 0.00028 | 0.24 | 37 |
| 244 | Example | 0.657 | 0.073 | 0.180 | 0.000 | 0.070 | 0.000 | 0.250 | 0.730 | 0.03 | 0.10 | 0.20 | 0.00022 | 0.18 | 38 |
| 245 | Example | 0.630 | 0.070 | 0.180 | 0.000 | 0.100 | 0.000 | 0.280 | 0.700 | 0.07 | 0.20 | 0.36 | 0.00037 | 0.27 | 36 |
| 246 | Example | 0.585 | 0.065 | 0.180 | 0.000 | 0.150 | 0.000 | 0.330 | 0.650 | 0.09 | 0.26 | 0.47 | 0.00047 | 0.34 | 34 |
| 247 | Example | 0.540 | 0.060 | 0.180 | 0.000 | 0.200 | 0.000 | 0.380 | 0.600 | 0.12 | 0.34 | 0.60 | 0.00060 | 0.43 | 33 |
| 248 | Example | 0.495 | 0.055 | 0.180 | 0.000 | 0.250 | 0.000 | 0.430 | 0.550 | 0.25 | 0.58 | 0.96 | 0.00089 | 0.64 | 31 |
| 249 | Comparative Example | 0.486 | 0.054 | 0.180 | 0.000 | 0.260 | 0.000 | 0.440 | 0.540 | 0.47 | 1.16 | 1.93 | 0.00183 | 1.22 | 27 |
| 217 | Example | 0.648 | 0.072 | 0.180 | 0.010 | 0.070 | 0.000 | 0.260 | 0.720 | 0.02 | 0.07 | 0.14 | 0.00015 | 0.14 | 40 |
| 250 | Example | 0.647 | 0.072 | 0.180 | 0.010 | 0.070 | 0.001 | 0.261 | 0.719 | 0.03 | 0.09 | 0.18 | 0.00018 | 0.17 | 40 |
| 251 | Example | 0.639 | 0.071 | 0.180 | 0.010 | 0.070 | 0.010 | 0.270 | 0.710 | 0.06 | 0.20 | 0.36 | 0.00037 | 0.28 | 36 |
| 252 | Example | 0.630 | 0.070 | 0.180 | 0.010 | 0.070 | 0.020 | 0.280 | 0.700 | 0.12 | 0.31 | 0.53 | 0.00051 | 0.38 | 33 |
| 253 | Example | 0.621 | 0.069 | 0.180 | 0.010 | 0.070 | 0.030 | 0.290 | 0.690 | 0.29 | 0.62 | 0.99 | 0.00087 | 0.67 | 31 |
| 254 | Comparative Example | 0.620 | 0.069 | 0.180 | 0.010 | 0.070 | 0.031 | 0.291 | 0.689 | 0.54 | 1.00 | 1.67 | 0.00141 | 1.10 | 28 |

As can be seen from Table 17, each sample in which the B content (b), the P content (c), the Si content (d), the Cr content (e), and b+c+d+e were within specific ranges, and 0≤k≤0.00100 was satisfied, the coercivity of the cores and the relative permeability of the cores were satisfactory. In contrast, in each sample in which one or more of the B content (b), the P content (c), the Si content (d), the Cr content (e), and b+c+d+e were out of specific ranges, k was excessively large, the coercivity of the core was excessively high, and the relative permeability of the core was excessively low. Note that, samples other than Sample No. 231 had a structure composed of the amorphous material. Sample No. 231 included crystals greater than nanocrystals.

Experimental Example 14

Soft magnetic alloy powders and toroidal cores were manufactured under the same conditions as in Sample No. 207 except that a part of Co was substituted with Ni with respect to Sample No. 207. Results are shown in Table 18. Note that, with regard to a microstructure of the soft magnetic powder, it was not confirmed whether the structure composed of the amorphous material was the structure including only the amorphous material or the structure composed of the hetero amorphous material.

TABLE 18

| Sample No. | Example/Comparative Example | $(Co_{1-\alpha}Ni_{\alpha})_{0.720}Nb_{0.020}B_{0.180}P_{0.010}Si_{0.070}$ Co content | Fe content | α + β (β = 0) | $Y_H$ $X_P$ = 0 | $X_P$ = 400 | $X_P$ = 800 | k (Oe/MPa) | Coercivity of core (Oe) | Relative permeability of core |
|---|---|---|---|---|---|---|---|---|---|---|
| 207 | Example | 0.720 | 0.000 | 0.000 | 0.02 | 0.10 | 0.19 | 0.00021 | 0.17 | 38 |
| 255 | Example | 0.576 | 0.144 | 0.200 | 0.04 | 0.18 | 0.33 | 0.00036 | 0.26 | 36 |
| 256 | Example | 0.432 | 0.288 | 0.400 | 0.11 | 0.25 | 0.42 | 0.00039 | 0.32 | 35 |
| 258 | Comparative Example | 0.288 | 0.432 | 0.600 | 0.36 | 0.96 | 1.77 | 0.00176 | 1.04 | 27 |

As can be seen from Table 18, even in a case where a part of Co was substituted with Ni, and X1 was Ni, in samples of which a composition was within a specific range and in which 0≤k≤0.00100 was satisfied, the coercivity of the cores and the relative permeability of the cores were satisfactory. In contrast, in Sample No. 258 in which the Ni content was excessively large, k was excessively large, the coercivity of the core was excessively high, and the relative permeability of the core was excessively low. Note that, all samples in Table 18 had a structure composed of the amorphous material.

Experimental Example 14

Soft magnetic alloy powders and toroidal cores were manufactured under the same conditions as in Sample No. 207 except that a part of Co was substituted with X3 with respect to Sample No. 207. Results are shown in Table 19. Note that, with regard to a microstructure of the soft magnetic powders, it was not confirmed whether the structure composed of the amorphous material was the structure including only the amorphous material or the structure composed of the hetero amorphous material.

As can be seen from Table 19, even in a case where a part of Co was substituted with X3, in samples of which a composition was within a specific range and in which 0≤k≤0.00100 was satisfied, the coercivity of the cores and the relative permeability of the cores were satisfactory. Note that, all samples in Table 19 had the structure composed of the amorphous material.

Experimental Example 15

Soft magnetic alloy powders and toroidal cores were manufactured under the same conditions as in Sample No. 207 except that a part of Co was substituted with X1 and X3 with respect to Sample No. 207. Results are shown in Table 20. Note that, with regard to a microstructure of the soft magnetic powders, it was not confirmed whether the structure composed of the amorphous material is the structure including only the amorphous material or the structure composed of the hetero amorphous material.

TABLE 19

| Sample No. | Example/ Comparative Example | $(Co_{1-\beta}X3_{\beta})_{0.720}Nb_{0.020}B_{0.180}P_{0.010}Si_{0.070}$ Co content | X3 Kind | X3 Content | α + β (α = 0) | $Y_H$ $X_P$ = 0 | $X_P$ = 400 | $X_P$ = 800 | k (Oe/ MPa) | Co- ercivity of core (Oe) | Relative perme- ability of core |
|---|---|---|---|---|---|---|---|---|---|---|---|
| 207 | Example | 0.720 | — | 0.000 | 0.000 | 0.02 | 0.10 | 0.19 | 0.00021 | 0.17 | 38 |
| 259 | Example | 0.719 | Al | 0.001 | 0.001 | 0.05 | 0.15 | 0.29 | 0.00031 | 0.22 | 37 |
| 260 | Example | 0.715 | Al | 0.005 | 0.007 | 0.06 | 0.18 | 0.35 | 0.00036 | 0.26 | 36 |
| 261 | Example | 0.710 | Al | 0.010 | 0.014 | 0.06 | 0.19 | 0.35 | 0.00037 | 0.27 | 36 |
| 262 | Example | 0.690 | Al | 0.030 | 0.042 | 0.06 | 0.20 | 0.36 | 0.00037 | 0.28 | 36 |
| 263 | Example | 0.719 | Zn | 0.001 | 0.001 | 0.04 | 0.15 | 0.28 | 0.00030 | 0.22 | 37 |
| 264 | Example | 0.715 | Zn | 0.005 | 0.007 | 0.05 | 0.17 | 0.30 | 0.00032 | 0.26 | 37 |
| 265 | Example | 0.710 | Zn | 0.010 | 0.014 | 0.06 | 0.19 | 0.33 | 0.00034 | 0.26 | 36 |
| 266 | Example | 0.690 | Zn | 0.030 | 0.042 | 0.06 | 0.19 | 0.35 | 0.00037 | 0.28 | 36 |
| 267 | Example | 0.719 | Sn | 0.001 | 0.001 | 0.05 | 0.18 | 0.34 | 0.00036 | 0.26 | 36 |
| 268 | Example | 0.715 | Sn | 0.005 | 0.007 | 0.06 | 0.18 | 0.34 | 0.00035 | 0.26 | 36 |
| 269 | Example | 0.710 | Sn | 0.010 | 0.014 | 0.07 | 0.19 | 0.34 | 0.00034 | 0.26 | 36 |
| 270 | Example | 0.690 | Sn | 0.030 | 0.042 | 0.09 | 0.22 | 0.41 | 0.00040 | 0.28 | 35 |
| 271 | Example | 0.719 | Cu | 0.001 | 0.001 | 0.04 | 0.17 | 0.32 | 0.00035 | 0.24 | 36 |
| 272 | Example | 0.715 | Cu | 0.005 | 0.007 | 0.03 | 0.17 | 0.32 | 0.00037 | 0.25 | 36 |
| 273 | Example | 0.710 | Cu | 0.010 | 0.014 | 0.06 | 0.19 | 0.35 | 0.00037 | 0.25 | 36 |
| 274 | Example | 0.690 | Cu | 0.030 | 0.042 | 0.06 | 0.21 | 0.38 | 0.00040 | 0.29 | 35 |
| 275 | Example | 0.719 | Bi | 0.001 | 0.001 | 0.04 | 0.15 | 0.29 | 0.00031 | 0.23 | 37 |
| 276 | Example | 0.715 | Bi | 0.005 | 0.007 | 0.05 | 0.17 | 0.33 | 0.00034 | 0.24 | 36 |
| 277 | Example | 0.710 | Bi | 0.010 | 0.014 | 0.05 | 0.18 | 0.34 | 0.00036 | 0.25 | 36 |
| 278 | Example | 0.690 | Bi | 0.030 | 0.042 | 0.04 | 0.17 | 0.32 | 0.00035 | 0.25 | 36 |
| 279 | Example | 0.719 | La | 0.001 | 0.001 | 0.05 | 0.19 | 0.34 | 0.00036 | 0.26 | 36 |
| 280 | Example | 0.715 | La | 0.005 | 0.007 | 0.04 | 0.16 | 0.31 | 0.00034 | 0.25 | 36 |
| 281 | Example | 0.710 | La | 0.010 | 0.014 | 0.07 | 0.21 | 0.39 | 0.00039 | 0.28 | 35 |
| 282 | Example | 0.690 | La | 0.030 | 0.042 | 0.09 | 0.23 | 0.42 | 0.00041 | 0.31 | 35 |
| 283 | Example | 0.719 | Y | 0.001 | 0.001 | 0.05 | 0.18 | 0.34 | 0.00036 | 0.26 | 36 |
| 284 | Example | 0.715 | Y | 0.005 | 0.007 | 0.07 | 0.21 | 0.39 | 0.00040 | 0.29 | 35 |
| 285 | Example | 0.710 | Y | 0.010 | 0.014 | 0.07 | 0.22 | 0.40 | 0.00042 | 0.29 | 35 |
| 286 | Example | 0.690 | Y | 0.030 | 0.042 | 0.09 | 0.25 | 0.43 | 0.00043 | 0.33 | 35 |
| 287 | Example | 0.719 | N | 0.001 | 0.001 | 0.08 | 0.21 | 0.37 | 0.00036 | 0.27 | 36 |
| 288 | Example | 0.719 | 0 | 0.001 | 0.001 | 0.04 | 0.15 | 0.29 | 0.00031 | 0.23 | 37 |
| 289 | Example | 0.719 | C | 0.001 | 0.001 | 0.03 | 0.14 | 0.27 | 0.00030 | 0.22 | 37 |
| 290 | Example | 0.719 | S | 0.001 | 0.001 | 0.04 | 0.17 | 0.30 | 0.00033 | 0.23 | 37 |

TABLE 20

| Sample No. | Example/Comparative Example | $(Co_{1-(\alpha+\beta)}X1_{\alpha}X3_{\beta})_{0.720}Nb_{0.020}B_{0.180}P_{0.010}Si_{0.070}$ Co content | X1 Kind | X1 Content | X3 Kind | X3 Content | α | β | α + β | $Y_H$ $X_P$ = 0 | $X_P$ = 400 | $X_P$ = 800 | k (Oe/MPa) | Coercivity of core (Oe) | Relative permeability of core |
|---|---|---|---|---|---|---|---|---|---|---|---|---|---|---|---|
| 291 | Example | 0.620 | $Fe_{0.5}Ni_{0.5}$ | 0.100 | — | 0.000 | 0.139 | 0.000 | 0.139 | 0.09 | 0.21 | 0.35 | 0.00032 | 0.28 | 37 |
| 292 | Example | 0.570 | Fe | 0.100 | Al | 0.050 | 0.139 | 0.069 | 0.208 | 0.10 | 0.25 | 0.42 | 0.00040 | 0.31 | 35 |
| 293 | Example | 0.570 | Fe | 0.100 | Zn | 0.050 | 0.139 | 0.069 | 0.208 | 0.08 | 0.21 | 0.37 | 0.00037 | 0.29 | 36 |
| 294 | Example | 0.570 | Fe | 0.100 | Sn | 0.050 | 0.139 | 0.069 | 0.208 | 0.07 | 0.20 | 0.34 | 0.00034 | 0.28 | 36 |
| 295 | Example | 0.570 | Fe | 0.100 | Cu | 0.050 | 0.139 | 0.069 | 0.208 | 0.07 | 0.17 | 0.31 | 0.00030 | 0.25 | 37 |
| 296 | Example | 0.570 | Fe | 0.100 | Bi | 0.050 | 0.139 | 0.069 | 0.208 | 0.08 | 0.21 | 0.36 | 0.00035 | 0.29 | 36 |
| 297 | Example | 0.570 | Fe | 0.100 | La | 0.050 | 0.139 | 0.069 | 0.208 | 0.07 | 0.20 | 0.36 | 0.00036 | 0.26 | 36 |
| 298 | Example | 0.570 | Fe | 0.100 | Y | 0.050 | 0.139 | 0.069 | 0.208 | 0.09 | 0.22 | 0.37 | 0.00035 | 0.29 | 36 |
| 299 | Example | 0.570 | Ni | 0.100 | Al | 0.050 | 0.139 | 0.069 | 0.208 | 0.10 | 0.25 | 0.42 | 0.00041 | 0.32 | 35 |
| 300 | Example | 0.570 | Ni | 0.100 | Zn | 0.050 | 0.139 | 0.069 | 0.208 | 0.09 | 0.23 | 0.41 | 0.00040 | 0.31 | 35 |
| 301 | Example | 0.570 | Ni | 0.100 | Sn | 0.050 | 0.139 | 0.069 | 0.208 | 0.11 | 0.24 | 0.40 | 0.00036 | 0.32 | 36 |
| 302 | Example | 0.570 | Ni | 0.100 | Cu | 0.050 | 0.139 | 0.069 | 0.208 | 0.09 | 0.24 | 0.42 | 0.00041 | 0.33 | 35 |
| 303 | Example | 0.570 | Ni | 0.100 | Bi | 0.050 | 0.139 | 0.069 | 0.208 | 0.09 | 0.22 | 0.37 | 0.00035 | 0.29 | 36 |
| 304 | Example | 0.570 | Ni | 0.100 | La | 0.050 | 0.139 | 0.069 | 0.208 | 0.08 | 0.23 | 0.40 | 0.00040 | 0.30 | 35 |
| 305 | Example | 0.570 | Ni | 0.100 | Y | 0.050 | 0.139 | 0.069 | 0.208 | 0.10 | 0.26 | 0.44 | 0.00043 | 0.34 | 34 |

As can be seen from Table 20, even in a case where a part of Co was substituted with X1 and X3, in samples of which a composition was within a specific range and in which 0≤k≤0.00100 was satisfied, the coercivity of the cores and the relative permeability of the cores were satisfactory. Note that, all samples in Table 20 had the structure composed of the amorphous material.

Experimental Example 16

Soft magnetic alloy powders and toroidal cores were manufactured under the same conditions as in Sample No. 207 except that the kind of M was changed with respect to Sample No. 207. Results are shown in Table 21. Note that, with regard to a microstructure of the soft magnetic powders, it was not confirmed whether the structure composed of the amorphous material is the structure including only the amorphous material or the structure composed of the hetero amorphous material.

TABLE 21

| Sample No. | Example/Comparative Example | $Co_{0.720}M_{0.020}B_{0.180}P_{0.010}Si_{0.070}$ M Kind | $Y_H$ $X_P$ = 0 | $X_P$ = 400 | $X_P$ = 800 | k (Oe/MPa) | Coercivity of core (Oe) | Relative permeability of core |
|---|---|---|---|---|---|---|---|---|
| 207 | Example | Nb | 0.02 | 0.10 | 0.19 | 0.00021 | 0.17 | 38 |
| 306 | Example | Hf | 0.04 | 0.15 | 0.28 | 0.00030 | 0.23 | 37 |
| 307 | Example | Zr | 0.02 | 0.09 | 0.19 | 0.00021 | 0.17 | 38 |
| 308 | Example | Ta | 0.02 | 0.14 | 0.25 | 0.00029 | 0.21 | 37 |
| 309 | Example | Mo | 0.02 | 0.13 | 0.27 | 0.00032 | 0.21 | 37 |
| 310 | Example | W | 0.03 | 0.13 | 0.26 | 0.00029 | 0.20 | 37 |
| 311 | Example | V | 0.03 | 0.10 | 0.20 | 0.00021 | 0.18 | 38 |
| 312 | Example | Ti | 0.02 | 0.13 | 0.26 | 0.00030 | 0.21 | 37 |
| 313 | Example | $Nb_{0.5}Hf_{0.5}$ | 0.03 | 0.10 | 0.19 | 0.00020 | 0.17 | 38 |
| 314 | Example | $Zr_{0.5}Ta_{0.5}$ | 0.04 | 0.15 | 0.28 | 0.00029 | 0.24 | 37 |
| 315 | Example | $Nb_{0.4}Hf_{0.3}Zr_{0.3}$ | 0.04 | 0.11 | 0.21 | 0.00021 | 0.19 | 38 |

As can be seen from Table 21, even in a case where the kind of M was changed, in samples of which a composition was within a specific range and in which 0≤k≤0.00100 was satisfied, the coercivity of the cores and the relative permeability of the cores were satisfactory. Note that, all samples in Table 21 had the structure composed of the amorphous material.

What is claimed is:

1. A soft magnetic alloy powder comprising:

a main component having a composition formula of $$(Co_{(1-(\alpha+\beta))}X1_{\alpha}X2_{\beta})_{(1-(a+b+c+d+e+f))}M_aB_bP_cSi_dCr_eS_f$$
(atom number ratio), wherein X1 represents one or more selected from the group consisting of Fe and Ni, X2 represents one or more selected from the group consisting of Al, Mn, Ag, Zn, Sn, As, Sb, Cu, Bi, N, O, C, and rare-earth elements, M represents one or more selected from the group consisting of Nb, Hf, Zr, Ta, Mo, W, Ti, and V, 0.001≤a≤0.140, 0.180≤b≤0.220, 0.010≤c≤0.050, 0≤d≤0.250, 0≤e≤0.030, 0≤f≤0.010, 0.160≤b+c+d+e+f≤0.430, 0.500<1−(a+b+c+d+e+f)<0.840,

α≥0,

β≥0, and

0≤α+β<0.50 are satisfied, the soft magnetic alloy powder has a glass transition point Tg and a melting point Tm, 900° C.≤Tm≤1200° C. is satisfied, and a coercivity He of the soft magnetic alloy powder is 0.04 Oe or less.

2. The soft magnetic alloy powder according to claim 1, wherein average circularity of powder particles included in the soft magnetic alloy powder is 0.93 or greater, and a number percentage of the powder particles having a circularity of 0.50 or less is 2.0% or less.

3. The soft magnetic alloy powder according to claim 1, wherein average circularity of powder particles included in the soft magnetic alloy powder is 0.95 or greater, and a number percentage of the powder particles having a circularity of 0.50 or less is 1.5% or less.

4. The soft magnetic alloy powder according to claim 1, wherein a value obtained by dividing an atom number ratio of Co by an atom number ratio of B is greater than 2.000 and less than 5.000.

5. The soft magnetic alloy powder according to claim 1, further including an amorphous material.

6. The soft magnetic alloy powder according to claim 1, further including a nanocrystal material.

7. A magnetic core comprising: the soft magnetic alloy powder according to claim 1.

8. A magnetic component comprising the soft magnetic alloy powder according to claim 1.

9. An electronic device comprising the soft magnetic alloy powder according to claim 1.

* * * * *